US010256012B2

(12) United States Patent
Masui et al.

(10) Patent No.: US 10,256,012 B2
(45) Date of Patent: Apr. 9, 2019

(54) MANUFACTURING METHOD OF ASSEMBLY CONDUCTOR, AND ELECTRIC MOTOR PROVIDED WITH ASSEMBLY CONDUCTOR

(71) Applicants: Toshiaki Masui, Okazaki (JP); Hirofumi Inoshita, Nagoya (JP)

(72) Inventors: Toshiaki Masui, Okazaki (JP); Hirofumi Inoshita, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 570 days.

(21) Appl. No.: 14/777,088

(22) PCT Filed: Apr. 16, 2014

(86) PCT No.: PCT/IB2014/000554
§ 371 (c)(1),
(2) Date: Sep. 15, 2015

(87) PCT Pub. No.: WO2014/170739
PCT Pub. Date: Oct. 23, 2014

(65) Prior Publication Data
US 2016/0027559 A1 Jan. 28, 2016

(30) Foreign Application Priority Data

Apr. 19, 2013 (JP) .................................. 2013-088107

(51) Int. Cl.
*H01B 13/02* (2006.01)
*H02K 3/14* (2006.01)
*H01B 13/00* (2006.01)

(52) U.S. Cl.
CPC .......... *H01B 13/02* (2013.01); *H01B 13/0006* (2013.01); *H01B 13/0285* (2013.01); *D07B 2201/2004* (2013.01); *H02K 3/14* (2013.01)

(58) Field of Classification Search
CPC ................. H02K 3/14; H02K 15/0414; D07B 2201/2004; H01B 13/02; H01B 13/0006; H01B 13/0285
See application file for complete search history.

(56) References Cited

U.S. PATENT DOCUMENTS 5,133,121 A * 7/1992 Birbeck ............. H01B 13/0285
174/126.1
2002/0050395 A1 5/2002 Kusumoto et al.

FOREIGN PATENT DOCUMENTS

EP 0 331 182 A1 9/1989
FR 708162 A * 7/1931 ............... H02K 3/12
(Continued)

*Primary Examiner* — Livius Radu Cazan
(74) *Attorney, Agent, or Firm* — Oliff PLC

(57) ABSTRACT

An assembly conductor manufacturing method includes aligning, around a center strand, a plurality of peripheral strands, each having at least two side surfaces, one of which opposes an adjacent peripheral strand on one side in a circumferential direction and the other of which opposes an adjacent peripheral strand on the other side in the circumferential direction, so as to form an assembly conductor in which the center strand and the peripheral strands are aligned; twisting the plurality of peripheral strands around the center strand that forms the assembly conductor; and plastic forming the twisted assembly conductor into a substantially rectangular sectional shape. The peripheral strand provided with the two side surfaces has a sectional shape in which a width between the side surfaces becomes narrower toward the center strand.

7 Claims, 17 Drawing Sheets

(56) References Cited

FOREIGN PATENT DOCUMENTS

| | | |
|---|---|---|
| GB | 2 235 891 A | 3/1991 |
| JP | S55-77313 U | 5/1980 |
| JP | S64-31308 A | 2/1989 |
| JP | H01-225006 A | 9/1989 |
| JP | 2009199749 A * | 9/2009 |
| JP | 2009-245658 A | 10/2009 |

* cited by examiner

MANUFACTURING METHOD OF ASSEMBLY CONDUCTOR, AND ELECTRIC MOTOR PROVIDED WITH ASSEMBLY CONDUCTOR

BACKGROUND OF THE INVENTION

1. Field of the Invention

The invention relates to a manufacturing method of an assembly conductor, and an electric motor provided with this assembly conductor.

2. Description of Related Art

A coil conducting wire is typically an assembly conductor that is formed by conductor lines with an internal conductor of each having a small sectional area, such that the assembly conductor has divided shapes in a cross-section. This conductor is able to reduce copper eddy loss that occurs in the coil. One such electric line used for this coil is formed of a plurality of conductors twisted together.

In this coil conducting wire, the conductor space factor that accounts for space is reduced by undesirable gaps between conductor lines. The decrease in the conductor space factor leads to an increase in the resistance value of the coil conducting wire. Therefore, Japanese Patent Application Publication No. 2009-245658 (JP 2009-245658 A) describes a method of forming a flat twisted conductor by twisting a plurality of circular-section conductors together, and processing them such that the sectional shape of the conductors overall is generally flat-shaped.

SUMMARY OF THE INVENTION

The method described in JP 2009-245658 A improves the space factor of the flat twisted conductor used in a coil. However, gaps between strands occur inside this flat twisted conductor. Therefore, the space factor of the conductor in the flat twisted conductor decreases. The invention provides an assembly conductor including a flat twisted conductor, and improves the space factor of a conductor of a coil or the like provided with this assembly conductor.

A first aspect of the invention relates to an assembly conductor manufacturing method that includes aligning, around a center strand, a plurality of peripheral strands, each having at least two side surfaces, one of which opposes an adjacent peripheral strand on one side in a circumferential direction and the other of which opposes an adjacent peripheral strand on the other side in the circumferential direction, so as to form an assembly conductor in which the center strand and the peripheral strands are aligned; twisting the plurality of peripheral strands around the center strand that forms the assembly conductor; and plastic forming the twisted assembly conductor into a substantially rectangular sectional shape. The peripheral strands provided with the two side surfaces each have a sectional shape in which a width between the side surfaces becomes narrower toward the center strand.

An inner peripheral surface that contacts an end portion of each of the two side surfaces on the side near the center strand, and that opposes the center strand, may be formed on each peripheral strand. An outside surface of the center strand may have a sectional shape that protrudes outward and is continuous in a direction in which the center strand extends. The inner peripheral surface may have a sectional shape that curves inward, and is continuous in a direction in which the peripheral strand extends.

The assembly conductor manufacturing method may also include strand forming by plastic deforming, for example, rolling, an outer peripheral portion of a conductor line that is to become at least a portion of the peripheral strands, and forming the two side surfaces, before aligning the peripheral strands. The peripheral strands on which the two side surfaces are formed are given a higher hardness than the center strand when strand forming.

A clearance may be provided between the side surfaces of the adjacent peripheral strands while an inner peripheral surface of each peripheral strand is contacting the center strand, when the peripheral strands are aligned around the center strand. The clearance may be reduced while the inner peripheral surface of each peripheral strand is contacting the center strand when the plurality of peripheral strands are twisted.

The peripheral strands provided with the two side surfaces may each have a sectional shape in which a width between the side surfaces becomes narrower toward the center strand, such that the clearance becomes narrower toward the center strand, when aligning the peripheral strands around the center strand.

When aligning the peripheral strands, a length in the circumferential direction between the two side surfaces of the peripheral strands satisfies Expression (1) below at a distance d/2 from the center of the assembly conductor.

$$W_0 \leq \pi \cdot d/n \cdot P/\sqrt{(\pi^2 \cdot d^2 + P^2)} \tag{1}$$

Here, d/2 is a distance from the center of the assembly conductor after alignment, and P is a length (twist pitch) corresponding to one twist of the assembly conductor after twisting. Another aspect of the invention relates to an electric motor provided with a coil that includes the assembly conductor manufactured by any of the methods described above.

The aspect of the invention is thus able to provide a twisted conductor having a substantially flat shape, and improve the space factor of a conductor of a coil or the like provided with this twisted conductor.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Example Embodiment

Figure 1:
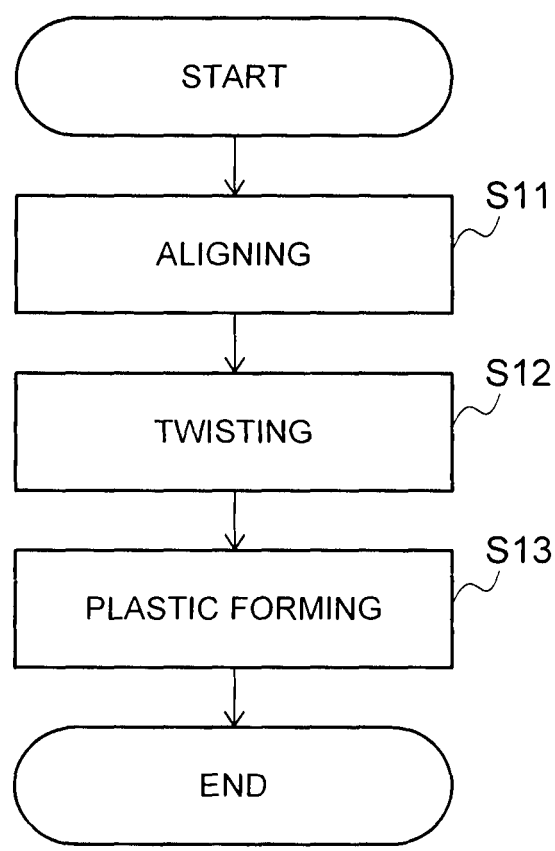
FIG. 1 is a view of a flowchart illustrating a manufacturing method of an assembly conductor according to a first example embodiment of the invention.

The manufacturing method of an assembly conductor of the example embodiment is a manufacturing method of an assembly conductor formed by an assembly of conductor lines. The manufacturing method of the assembly conductor includes an alignment process S11, a twisting process S12, and a plastic forming process S13, as shown in FIG. 1.

<Manufacturing Method>

Figure 2:
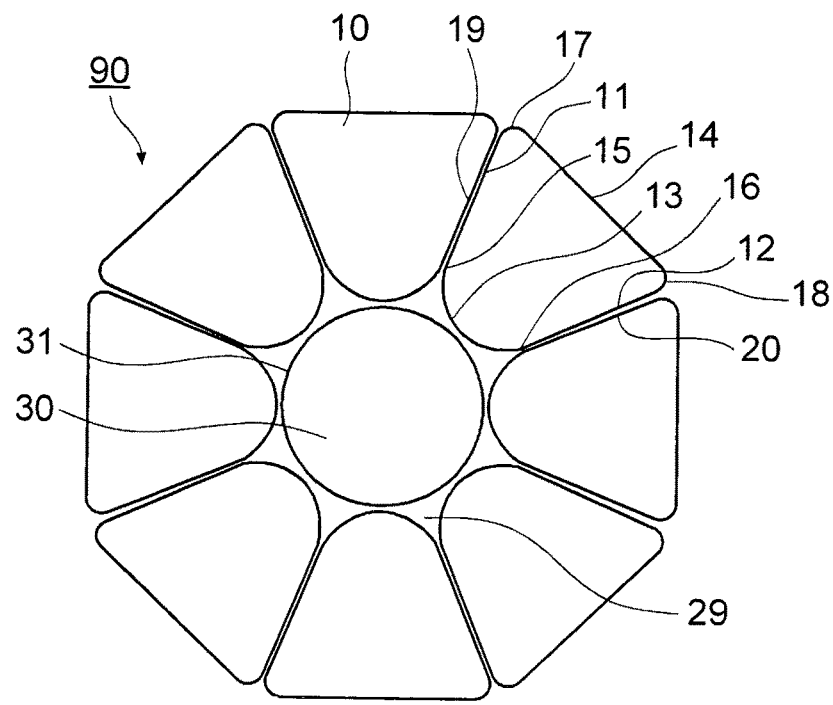
FIG. 2 is a sectional view of the assembly conductor after an alignment process according to the first example embodiment.
Figure 3:
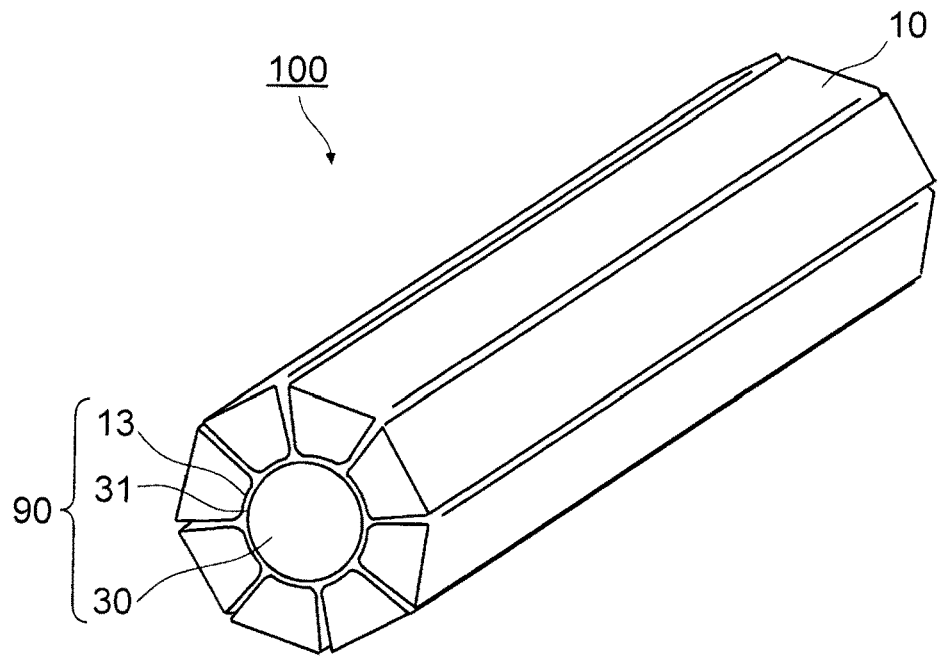
FIG. 3 is a schematic of the assembly conductor after the alignment process according to the first example embodiment.
Figure 4:
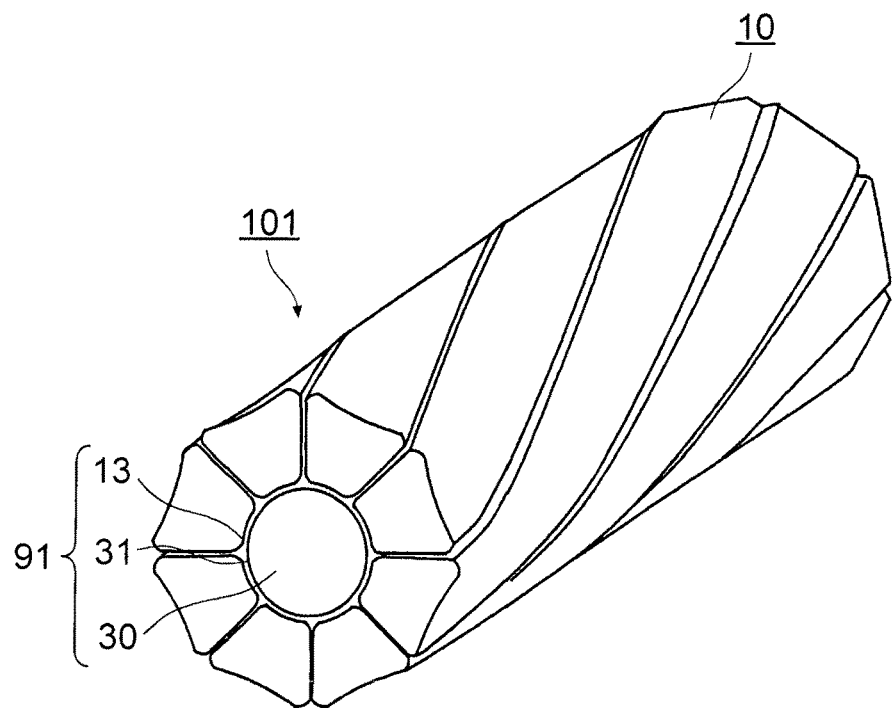
FIG. 4 is a schematic of the assembly conductor after a twisting process according to the first example embodiment.

The alignment process S11 is a process that involves arranging a plurality of peripheral strands 10, each of which is formed by a conductor, around a center strand 30 that is also formed by a conductor, so as to form an assembly conductor in which the center strand 30 and the peripheral strands 10 are aligned, i.e., so as to form an aligned assembly conductor 100, as shown in FIGS. 2 and 3.

The center strand 30 is positioned in the center of the aligned assembly conductor 100, thus filling in the space.

Therefore, a gap 29 in the center of the aligned assembly conductor 100 is able to be reduced. This gap 29 is an undesirable gap that reduces a conductor space factor of an assembly conductor 102 that will be described later. Also, the center strand 30 is provided, so the gap 29 is able to be efficiently reduced.

This example embodiment relates to a twisted assembly conductor. The advantages of the twists will be described later, but the center strand 30 is not absolutely necessarily for a twisted assembly conductor, i.e., the center strand 30 does not have to be wound in a spiral. Therefore, the aligned assembly conductor 100 may be aligned without the center strand 30, for example.

In this case, the peripheral strands 10 may have a fan-like sectional shape having a tip end that tapers toward the center of the aligned assembly conductor 100. As a result, the space located at the center of the aligned assembly conductor 100 is able to be filled.

However, the peripheral strands having this kind of shape are difficult to obtain by forming wire, so the production efficiency will decrease. Therefore, in this example embodiment, the center strand 30 is aligned inside the aligned assembly conductor 100.

In the alignment process S11, at least some of the peripheral strands 10 have two or more side surfaces. As shown in FIG. 2, one peripheral strand 10 has a side surface 11 and a side surface 12. Furthermore, of these two or more side surfaces, two of the side surfaces oppose peripheral strands 10 on both sides that are adjacent in a circumferential direction.

As shown in FIG. 2, the side surface 11 opposes a side surface 19 of an adjacent peripheral strand 10 on one side. Also, the side surface 12 opposes a side surface 20 of an adjacent peripheral strand 10 on the other side. Therefore, a gap between adjacent peripheral strands 10 becomes smaller. Except for in the case of a third example embodiment of the invention that will be described later, this gap is an undesirable gap that reduces the conductor space factor of the assembly conductor 102.

Furthermore, the gap between the two side surfaces becomes narrower from an outer peripheral side of the aligned assembly conductor 100 toward the center strand 30 side of the aligned assembly conductor 100. As shown in FIGS. 2 and 3, each of the peripheral strands 10 is such that width between the side surface 11 and the side surface 12 becomes narrower toward the side with an inner peripheral surface 13 that will be described later. However, in the alignment step S1, each peripheral strand 10 may also be aligned such that the side with the inner peripheral surface 13 where the width is narrow comes close to, or contacts, the center strand 30. Therefore, the gap 29 between the peripheral strand 10 and the center strand 30 becomes smaller.

The twisting process S12 is a process for forming a twisted assembly conductor 101 by twisting the aligned assembly conductor 100 around the center strand 30. Hereinafter, this twisted assembly conductor 101 may also be referred to simply as "twisted assembly conductor". The aligned assembly conductor 100 is an assembly conductor in which the center strand 30 and the peripheral strands 10 having the shape described above are aligned, so in the twisting process S12, a cross-section 91 is able to be created by twisting the aligned assembly conductor 100 while maintaining the substantially circular shape of a cross-section 90.

The assembly conductor will be coil material, so it may be bent in a U-shape, for example. When current is applied to this assembly conductor, circulation current may be generated in the assembly conductor. Therefore, the assembly conductor may be formed from a twisted assembly conductor.

With a twisted assembly conductor, a plurality of the peripheral strands 10 are twisted in a spiral, so circulation current tends not to be generated. In the twisting process S12, the twisting direction is not particularly limited. The effect described above is displayed regardless of whether the twisting direction is a right twisting direction or a left twisting direction.

Figure 5:
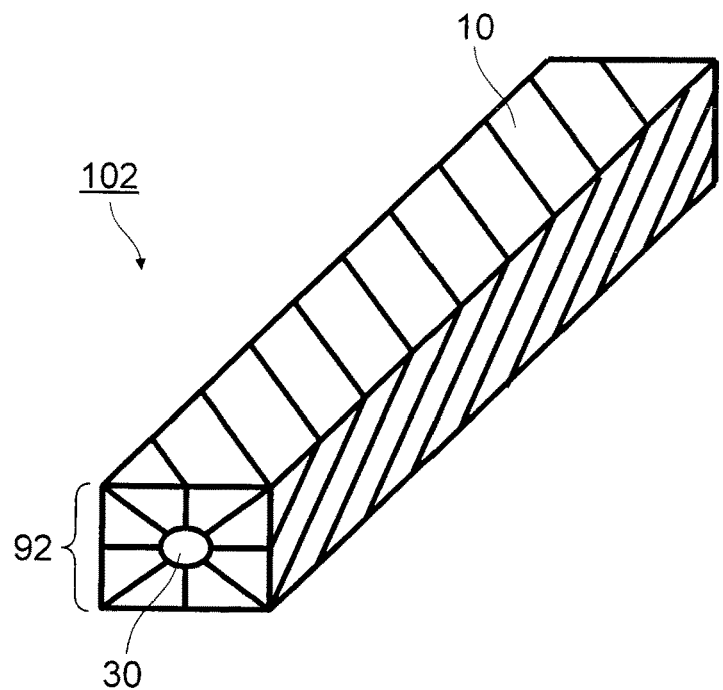
FIG. 5 is a schematic of the assembly conductor after a plastic forming process according to the first example embodiment.

The plastic forming process S13 is a process for forming the assembly conductor 102, as is shown in FIG. 5, from the twisted assembly conductor 101. The plastic forming process S13 is a process that involves applying external force to the twisted assembly conductor 101, which has been twisted, and plastic forming this twisted assembly conductor 101 into a substantially rectangular (flat) sectional shape. The twisted assembly conductor 101 maintains its substantially circular shape, so the assembly conductor 102 in which the space factor of the conductor is high is able to be formed in the plastic forming process S13.

Figure 7:
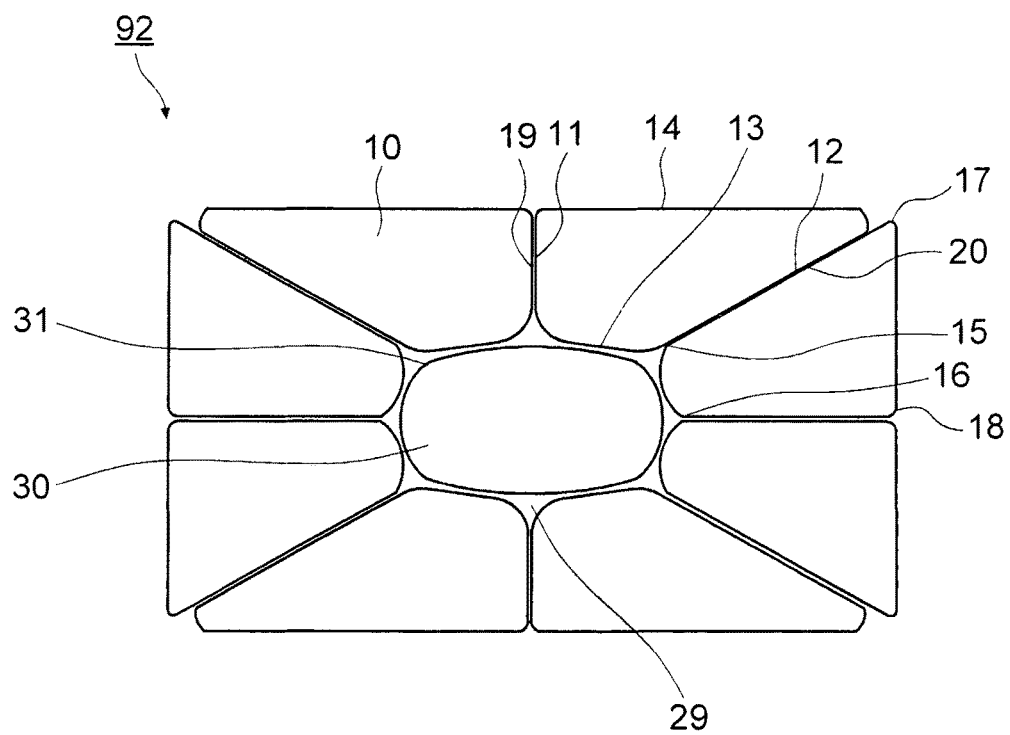
FIG. 7 is a sectional view of the assembly conductor according to the first example embodiment.

When forming the twisted assembly conductor 101, substantially planar pressure may be applied in both the vertical direction and the lateral direction, in the drawing, of the substantially flat shape of a cross-section 92. As a result of this process, the assembly conductor 102 has a substantially rectangular (flat) cross-section 92, as shown in FIG. 7.

The assembly conductor 102 has the substantially rectangular (flat) cross-section 92. Therefore, when further bundling it (i.e., the assembly conductor 102) as a part for a coil or the like, for example, the assembly conductor 102 can be bundled tightly in the vertical and lateral directions in the drawing, such that the gaps between the assembly conductors are small. Therefore, the conductivity of the parts of the coil or the like improves.

Figure 6:
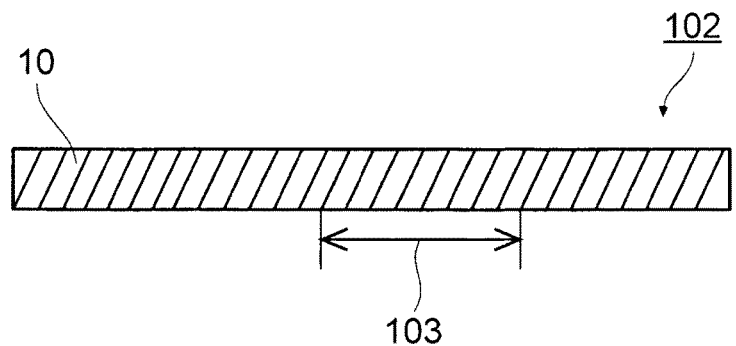
FIG. 6 is a side view of the assembly conductor after the plastic forming process according to the first example embodiment.

The assembly conductor 102 has a plurality of the peripheral strands 10 that are twisted in a spiral, as described above. As shown in FIGS. 5 and 6, the assembly conductor has a twist pitch 103 after a predetermined molding process. This twist pitch 103 is a length that the assembly conductor 102 advances each time one peripheral strand 10 goes around the center strand 30 once. Similarly, the twisted assembly conductor 101 prior to being formed also has a twist pitch P. The twist pitch 103 may be longer than the twist pitch P depending on the degree of compression described above.

<Peripheral Strands>

In the alignment process S11, each peripheral strand 10 has an inner peripheral surface 13 that contacts an end portion of each of the two side surfaces on the side near the center strand 30, and that opposes the center strand 30. As shown in FIG. 2, the inner peripheral surface 13 contacts an end portion 15 of the side surface 11. The inner peripheral surface 13 also contacts an end portion 16 of the side surface 12.

Each of the peripheral strands 10 has the inner peripheral surface 13, so a constant width is maintained between the end portion 15 and the end portion 16. Having this inner peripheral surface 13 thus enables the gap between adjacent peripheral strands 10 to be made small. Except for in the case of a third example embodiment of the invention that will be described later, this gap is an undesirable gap that reduces the conductor space factor of the assembly conductor 102.

As a comparative example, each of the peripheral strands 10 may have a tip end that points toward the center of the aligned assembly conductor 100, instead of having the inner peripheral surface 13. However, in this case, even if the peripheral strands 10 are aligned around the center strand 30, there will be relatively large gap between adjacent peripheral strands 10.

Except for in the case of the third example embodiment of the invention that will be described later, this gap is an undesirable gap that reduces the conductor space factor of the assembly conductor 102. Also, this shape will lead to a decrease in production efficiency, as described above.

Each peripheral strand 10 has an outer peripheral surface 14 that contacts an end portion of each of the two side surfaces on a side away from the center strand 30, and that faces the outer peripheral side of the aligned assembly conductor 100. As shown in FIG. 2, the outer peripheral surface 14 contacts an end portion 17 of the side surface 11. The outer peripheral surface 14 contacts an end portion 18 of the side surface 12.

A corner portion created by the outer peripheral surface 14 and the side surface 11 at the end portion 17 may be not very rounded, or may have a curvature larger than that of the outer peripheral surface 14. A corner portion created by the outer peripheral surface 14 and the side surface 12 at the end portion 18 may be not very rounded, or may have a curvature larger than that of the outer peripheral surface 14.

If the aligned assembly conductor 100 has the peripheral strands 10 as the outermost layer, the outer peripheral surface 14 will serve as the outside surface of the aligned assembly conductor 100. As a comparative example, each of the peripheral strands 10 may have a tip end that points toward the outside of the aligned assembly conductor 100, instead of having the outer peripheral surface 14.

In this case, irregularities on the outside surface of the aligned assembly conductor 100 would increase, so it would be difficult to obtain a substantially rectangular (flat) shape by the plastic forming process S13. Therefore, the substantially rectangular (flat) shape of the assembly conductor 102 is able to be effectively formed by each of the peripheral strands 10 having the outer peripheral surface 14.

Also, in the twisting process S12, the end portion 17 and the end portion 18 may rise relatively gradually due to twisting the aligned assembly conductor 100. Therefore, the outer peripheral surface 14 may have a convex surface that is continuous in the direction in which the peripheral strand 10 extends, provided between the end portion 17 and the end portion 18.

This convex surface may be a curved surface that protrudes outward. This convex surface may be a substantially arced-shape in the cross-section 90. As a result, irregularities on the surface of the twisted assembly conductor 101 after being twisted can be reduced.

A cross-section of the peripheral strands 10 may be mound-shaped as shown in FIG. 2. The cross-section of the peripheral strands 10 may also be substantially trapezoidal-shaped, and have an upper base formed by the inner peripheral surface 13, and a lower base formed by the outer peripheral surface 14.

The cross-section of the peripheral strands 10 may also be regular polygonal-shaped, or polygonal-shaped in which some of the sides are formed by the side surface 11 and the side surface 12. The cross-section of the peripheral strand 10 may also be polygonal-shaped in which three continuous sides are formed by the side surface 11, the inner peripheral surface 13, and the side surface 12.

Three or more, or five or more, of the peripheral strands 10 having the inner peripheral surface 13 may be provided. With these peripheral strands, the gap 29 between the center strand 30 and the peripheral strands 10 is able to be reduced, as shown in FIGS. 2 and 7, in the alignment process S11 even when if the cross-section of the center strand 30 is circular.

The peripheral strands 10 on both sides (i.e., one on each side) are adjacent on both sides, in the circumferential direction, of one peripheral strand 10 having two side surfaces, one being the side surface 11 and the other being the side surface 12. At least one of the two adjacent peripheral strands 10 may have two side surfaces formed by the side surface 11 and the side surface 12, and the inner peripheral surface 13 that contacts these two side surfaces. Moreover, all of the peripheral strands may have two side surfaces formed by the side surface 11 and the side surface 12, and the inner peripheral surface 13 that contacts these two side surfaces. When the aligned assembly conductor 100 has these peripheral strands, irregularities on the outside surface of the twisted assembly conductor 101 are reduced even after the twisting process S12.

The conductor line for forming the peripheral strands 10 may be metal wire or another material. From the viewpoint of conductivity, the peripheral strands 10 may be made of copper or tough pitch copper.

<Center Strand>

The center strand 30 may be made from one or two or more conductor lines. The center strand 30 may also be made from one conductor line, or from two or more conductor lines that have been bundled together. The center strand 30 may also be made from one conductor line. In this case, a gap between two or more conductor lines will not occur in the center strand 30. This gap is an undesirable gap that reduces the conductor space factor of the assembly conductor 102.

An outside surface 31 of the center strand 30 may have a convex cross-section that is continuous in the direction in which the center strand 30 extends. The line of the convex cross-section may be a curve that protrudes toward the outside. In this case, the gap 29 that occurs between the outside surface 31 of the center strand 30 and the inner peripheral surface 13 of the peripheral strand 10 is able to be made smaller.

The cross-section of the center strand 30 having the convex surface described above may be substantially circular. In this case, irregularities will not easily occur on the outside surface 31 in the twisting process, so the gap 29 is able to be made smaller.

The center strand 30, or the cross-section thereof, may have apexes at substantially equally-space intervals. The outside surface 31 of the center strand 30 may have the convex surface described above between these apexes.

Furthermore, the inner peripheral surface 13 that opposes the outside surface 31 may have a concave cross-section that is continuous in the direction in which the peripheral strand 10 extends. This concave cross-section may be a curve that curves toward the inside. This inner peripheral surface 13 may contact the center strand 30 along the outside surface 31.

In the alignment process S11, when the outside surface 31 and the inner peripheral surface 13 are fit together, the gap 29 that occurs between the outside surface 31 of the center strand 30 and the inner peripheral surface 13 of the peripheral strands 10 is able to be particularly small, as shown in FIGS. 2 and 7.

Also, the cross-section of the center strand 30 having the apexes described above may be substantially regular polygonal-shaped. This regular polygonal-shape may have the same number of sides as the number of peripheral strands 10 that have the inner peripheral surface 13. This same number of sides may all be opposing the inner peripheral surface 13 of the peripheral strands 10. The inner peripheral surface 13 may be substantially flat.

In the alignment process S11, when the outside surface 31 and the inner peripheral surface 13 are fit together, the gap 29 that occurs between the outside surface 31 of the center strand 30 and the inner peripheral surface 13 of the peripheral strands 10 is able to be particularly small, as shown in FIGS. 2 and 7.

The conductor line for forming the center strand 30 may be metal wire or another material. From the viewpoint of conductivity, the center strand 30 may be made of copper or tough pitch copper. The center strand 30 and the peripheral strands 10 may be made of the same conductor material so that conductivity between the center strand 30 and the peripheral strands 10 does not decrease.

<Manufacturing Method of the Peripheral Strands>

A strand forming process may also be provided before the alignment process S11. This strand forming process is a process for forming two side surfaces from the side surface 11 and the side surface 12, by plastic deforming an outer peripheral portion of conductor lines that will become the plurality of peripheral strands 10, which is accomplished by rolling for example. The method of plastic deforming may be any plastic forming process such as a drawing process or an extruding process, as long as peripheral strands having the two side surfaces are able to be obtained.

The production efficiency of the assembly conductor is improved by performing the alignment process S11 right after the strand forming process in a continuous manner without any break. For example, the plastic deforming and alignment of the conductor lines may be performed continuously, as is done by the manufacturing apparatus illustrated in FIG. 15 that will be described later. In the strand forming process, a plurality of peripheral strands 10 to be plastic deformed may be lined up on both sides of the center strand 30, and the peripheral strands 10 may be plastic deformed by a manufacturing apparatus.

<Application>

The assembly conductor of this example embodiment is able to reduce electrical resistance by 10% to 20% in a specific mode compared with the related art. Therefore, this example embodiment is applied to the applications described below.

An electric motor may be provided with a coil formed by the assembly conductor manufactured by the manufacturing method described above. This coil has low electrical resistance, so the electric motor displays performance equivalent to that described by related art with a small coil. Also, in this coil, the space factor is higher than it is with a coil of wound thin round wire. Further, in this coil, eddy current loss (AC loss) is able to be reduced compared to flat wire.

Also, providing a vehicle with this electric motor enables the vehicle to be lighter while maintaining the performance of related art. From the viewpoint of weight reduction, the vehicle may be provided with a drive portion that has this electric motor. This electric motor may be used in a hybrid vehicle or a plug-in hybrid vehicle.

Second Example Embodiment

A manufacturing method of an assembly conductor in a second example embodiment of the invention is a manufacturing method of an assembly conductor in which conductor lines are assembled. Before describing this second example embodiment of the invention with reference to FIG. 12 on, issues related to this example embodiment will be described with reference to technical modes 1 to 3 with reference to FIGS. 8 to 11.

<Technical Mode 1>

Under specific conditions, when an assembly conductor of bundled conductor lines is compressed and formed, there may be portions where the conductor lines in the assembly conductor do not easily deform. Therefore, the effect of filling in undesirable gaps between conductor lines by deforming the conductor lines is reduced. This phenomenon is a contributing factor that impedes improvement in the area ratio of the conductor, in a cross-section.

Figure 8:
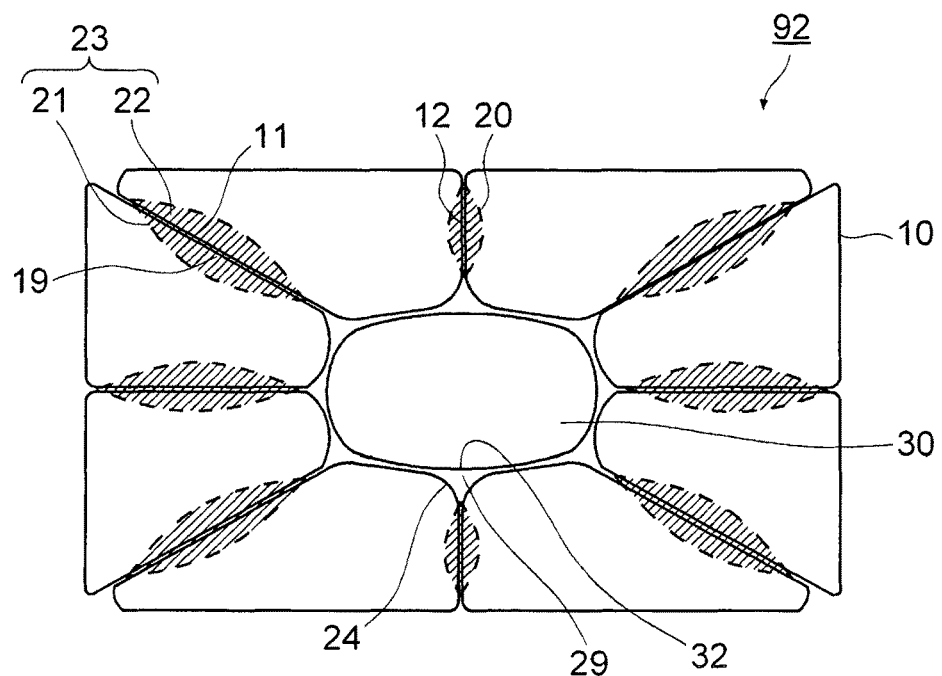
FIG. 8 is a first explanatory view of a technical issue according to a second example embodiment of the invention.

Technical mode 1 is the first example embodiment described above. In the first example embodiment, the gap 29 of the assembly conductor 102 is reduced, just as described above. Therefore, surface pressure 21 increases at the side surface 11 of the peripheral strands 10 where the pressure is high that was initially flattened, as shown in FIG. 8. Similarly, surface pressure 22 increases at the side surface 19. Hereinafter, the surface pressure 21 and the surface pressure 22 will be collectively referred to as the "surface pressure distribution 23".

On the other hand, a surface pressure distribution such as the surface pressure distribution 23 does not easily occur at an end portion 24 of the inner peripheral surface 13 and a portion 32 of the outside surface 31 that opposes this end portion 24. This indicates that deforming force tends not to be applied to the portions of these surfaces because drag with respect to external force applied to the twisted assembly conductor 101 occurs at the surface pressure distribution 23 in the plastic forming process S13.

Therefore, deformation that would cause the gap 29 between the peripheral strands 10 and the center strand 30 to fill in tends not to occur. Also, if a compression load when plastic forming the conductor into a substantially flat (rectangular) shape is increased in an attempt to eliminate the gap 29, a large load ends up being applied to the mold that applies pressure to the twisted assembly conductor 101, which may damage the mold. Therefore, effectively reducing the gap between the strands is difficult with the manufacturing method of the assembly conductor of this technical mode.

<Technical Mode 2>

Figure 9:
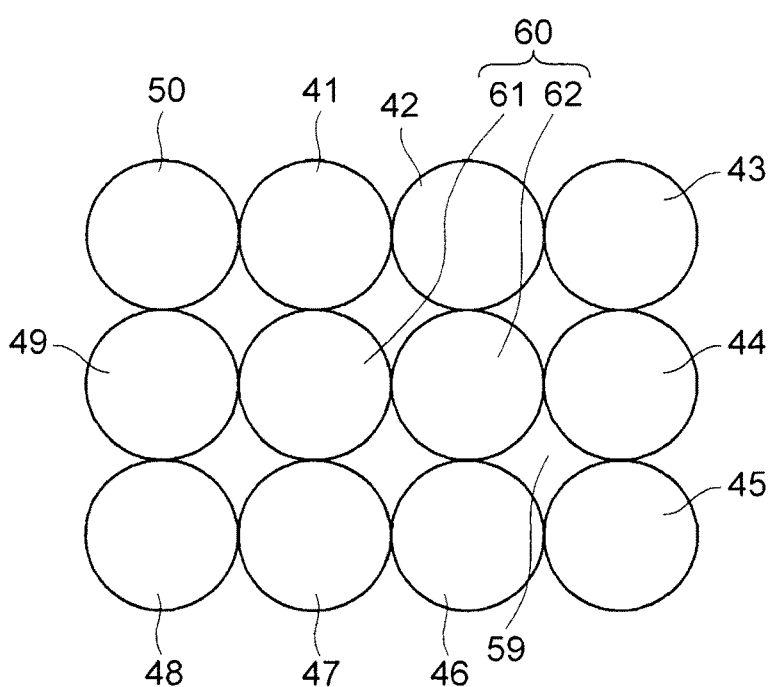
FIG. 9 is a second explanatory view of the technical issue according to the second example embodiment.

With the method of technical mode 2 compared to this example embodiment, a plurality of conductors having round sectional shapes as shown in FIG. 9 are twisted together. As shown in FIG. 9, strands 41 to 50 surround strand 61 and strand 62. Hereinafter, the strands 41 to 50 will be collectively referred to as "strands 40". Also, the strand 61 and the strand 62 will be collectively referred to as "strands 60". This technical mode does not include the twisting process.

Next, the plurality of conductors are formed so that the overall sectional shape becomes a generally flat (rectangular) shape. As a result, a twisted conductor having a substantially flat shape, which is a single assembly conductor, is formed. Pressure is applied to the strands having a round sectional shape when forming the conductors in this substantially flat shape.

Figure 10:
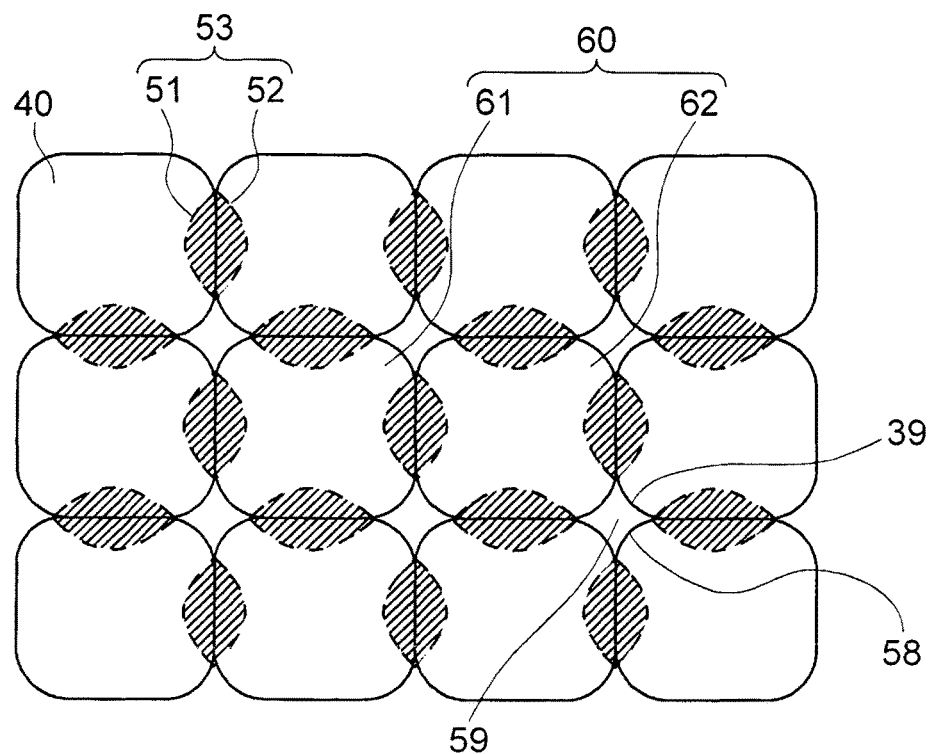
FIG. 10 is a third explanatory view of the technical issue according to the second example embodiment.

Therefore, surface pressure 51 and surface pressure 52 increase at the surface of the strands 40 where the pressure is high, which has been flattened initially, as shown in FIG. 10. Also, similarly, surface pressure also increases between the strands 40 and the strands 60, and between the strands 60 themselves. Hereinafter, these surface pressures will be collectively referred to as the "surface pressure distribution 53".

Meanwhile, the surface pressure distribution 53 does not easily occur on a surface 58 of each of the four corners of each strand 60 and on a surface 39 of each of the four corners of each strand 40. This indicates that the portion of these surfaces tend not to receive deforming force, because drag with respect to external force applied to the assembly conductor occurs at the surface pressure distribution 53.

Therefore, deformation that would cause a gap 59 between the strands 40 and the strands 60 to fill in tends not to occur. This gap is an undesirable gap that causes the conductor space factor of the assembly conductor to decrease. Therefore, with this manufacturing method of the twisted conductor that has a substantially flat shape of this technical mode, a gap tends to occur between the strands.

The twisted conductor having a substantially flat shape of this technical mode is similar to the flat twisted conductor described in JP 2009-245658 A in that the conductor lines are not shaped in advance prior to alignment. Therefore, with the flat twisted conductor described in JP 2009-245658 A as well, an undesirable gap tends to occur between conductor lines that are equivalent to the strands.

Also, with this method, because the conductor lines are not shaped in advance prior to alignment, the roundness of the conductor lines may appear on the outside surface of the assembly conductor. Therefore, gaps also tend to form on the outside surface of the assembly conductor.

<Technical Mode 3>

Figure 11:
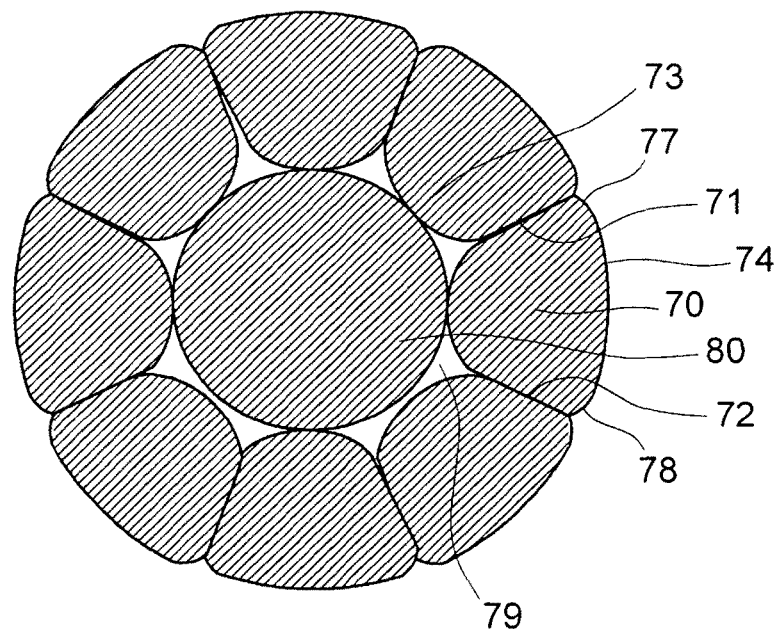
FIG. 11 is a fourth explanatory view of the technical issue according to the second example embodiment.

A method of technical mode 3 compared to the example embodiment is a method that attempts to fill in the gap between wires (lines) inside the assembly conductor by performing forming such as that shown in FIG. 11, for example, in advance. For example, strands 70 having a desired shape are formed by applying external pressure to the conductor lines to compress and form the conductor lines.

The strands 70 on the peripheral side each have a side surface 71 and a side surface 72. The strands 70 also each have an inner peripheral surface 73 that contacts an end portion of the side surface 71 and a side surface 72, and that opposes a strand 80 that is in the center. The strands 70 also each have an outer peripheral surface 74 that contacts end portions of the side surface 71 and a side surface 72, on the side away from the inner peripheral surface 73, and that faces the outer peripheral side of the assembly conductor. The outer peripheral surface 74 contacts an end portion 77 of the side surface 71. The outer peripheral surface 74 also contacts an end portion 78 of the side surface 72.

As shown in FIG. 11, the strands 70 are arranged around the strand 80 that is a conductor, such that the assembly conductor in which the strand 80 and the strands 70 are aligned is formed. The strand 80 is formed by compressing conductor lines, similar to the strands 70.

This technical mode is a mode that attempts to obtain an assembly conductor with a close structure by aligning each of the strands that have been compressed and formed in advance. However, because the circular conductor lines are only rolled, the end portion of the inner peripheral surface 73 of the strands after forming is still round. This roundness creates gaps 79 between the inner peripheral surface 73 and the strand 80.

This roundness may be due to roundness of the mold used when rolling the conductor lines. Therefore, it is difficult to fill in the gaps between the wires (lines) inside the assembly conductor beyond the limitations of the mold. Also, even with a mold that has no roundness, the mold may be damaged if the conductor lines are rolled with strong force such that corner roundness does not occur. Therefore, it is difficult to effectively make the gaps between strands smaller with the manufacturing method of the assembly conductor of this technical mode.

<Characteristics of the Second Example Embodiment>

The inventors discovered that it is possible to fill in undesirable gaps between strands inside the assembly conductor by making the hardness of each of the bundled conductor lines different, and preferentially deforming the conductor lines that are relatively softer. In this example embodiment, an assembly conductor is formed similar to the first example embodiment, except for the following. Hereinafter, equivalent members will be denoted by like reference characters, and redundant descriptions will be omitted.

Figure 12:
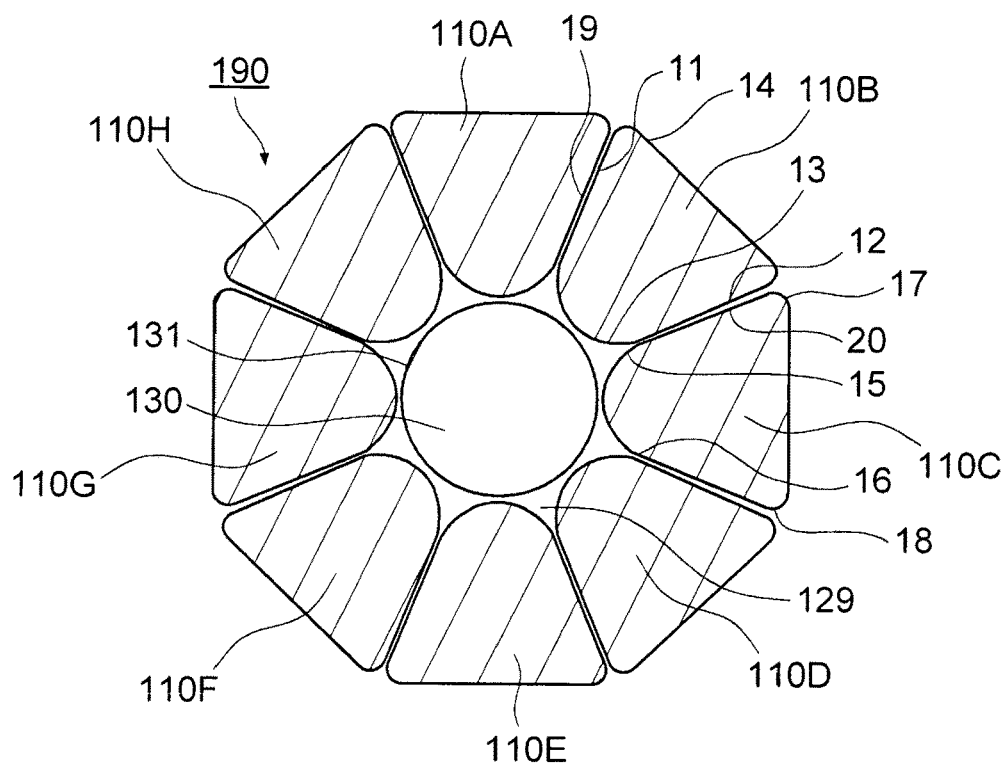
FIG. 12 is a sectional view of the assembly conductor after an alignment process according to the second example embodiment.

In the alignment process, peripheral strands 110A to 110H are aligned around a center strand 130, such that the peripheral strands 110 surround the center strand 130, as shown in FIG. 12. The peripheral strands 110A to 110H are all similar peripheral strands 110. One or more peripheral strands 110 has a higher hardness than the center strand 130. The shape, structure, or material of the conductor line that forms the center strand 130 is no different from the center strand 30 described above.

The two side surfaces described above may be formed on at least half or all of the plurality of peripheral strands so that at least half or all of the plurality of peripheral strands are the peripheral strands 110. Moreover, all of the peripheral strands 110A to 110H having the two side surfaces may be made to have a higher hardness than the center strand 130.

Figure 13:
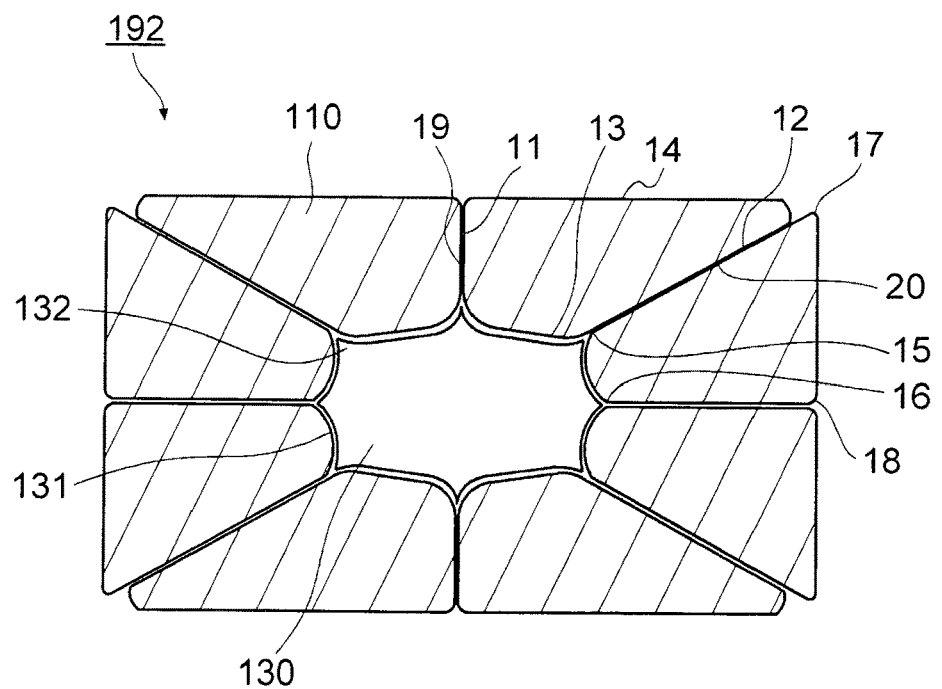
FIG. 13 is a sectional view of the assembly conductor after a plastic forming process according to the second example embodiment.

When the plastic forming process is performed, the outside surface 131 of the center strand 130 has a relatively low hardness and thus preferentially deforms so that a deformed end 132 of the center strand 130 fits into a gap 129, as shown in FIG. 13. The gap 129 is an undesirable gap that reduces the conductor space factor of the assembly conductor 102. This manufacturing method of this example embodiment enables the gaps 129 between the strands to efficiently be made smaller.

<First Modified Example of the Second Example Embodiment>

The invention is not limited to the described example embodiments, but may be embodied with various changes, modifications or improvements, without departing from the spirit and scope of the invention. The manufacturing method of this example embodiment may also include a softening process after the twisting process but before the plastic forming process.

In a first modified example of the second, example embodiment, the difference in hardness of the center strand and the peripheral strands is reversed. This will now be described with reference to FIG. 12. The softening process includes a process for giving the peripheral strands 110 that include the side surface 11 and the side surface 12 a lower hardness than the center strand 130. In this softening process, an outer peripheral portion of the twisted assembly conductor is heated by high-frequency heating to give the peripheral strands 110 lower hardness. With this high-frequency heating, the peripheral strands 110 is preferentially heated by the skin effect. Also, the peripheral strands 110 may be heated by electrical heating.

When the twisted assembly conductor is compressed and formed by the plastic forming process, the inner peripheral surface 13 fits into the gap 129. This is because the outside surface 131 of the peripheral strands 110 has a relatively high hardness, so the inner peripheral surface 13 preferentially deforms.

The gap 129 is a gap between the inner peripheral surface 13 and the outside surface 131. This gap 129 is an undesirable gap that reduces the conductor space factor of the assembly conductor. With this modified example of the example embodiment, the gap 129 is able to be effectively made smaller.

<Second Modified Example of the Second Example Embodiment>

In a second modified example of the second example embodiment, some of the peripheral strands are hardened. This will be now described with reference to FIG. 12. The method of the second modified example further includes a softening process that selectively gives peripheral strands a lower hardness, after the twisting process but before the plastic forming process. Peripheral strands 110B, 110D, 110F, and 110H, which are adjacent to other peripheral strands 110A, 110C, 110E, and 110G that have a high hardness, are given a lower hardness than the hardness of the peripheral strands 110A, 110C, 110E, and 110G.

In the softening process, the peripheral strands 110B, 110D, 110F, and 110H in the twisted assembly conductor are heated by electrical heating, such that they (i.e., the peripheral strands 110B, 110D, 110F, and 110H) are given a low hardness. Therefore, peripheral strands of different hardnesses are able to be arranged alternately in the circumferential direction.

The center strand 130 is crushed by the peripheral strands 110A, 110C, 110E, and 110G that have a high hardness, just as described above. Therefore, the gap in the outer peripheral region, i.e., in the region where the peripheral strands are arranged, is able to be eliminated. This gap is an undesirable gap that reduces the conductor space factor of the assembly conductor.

<Third Modified Example of the Second Example Embodiment>

Figure 14:
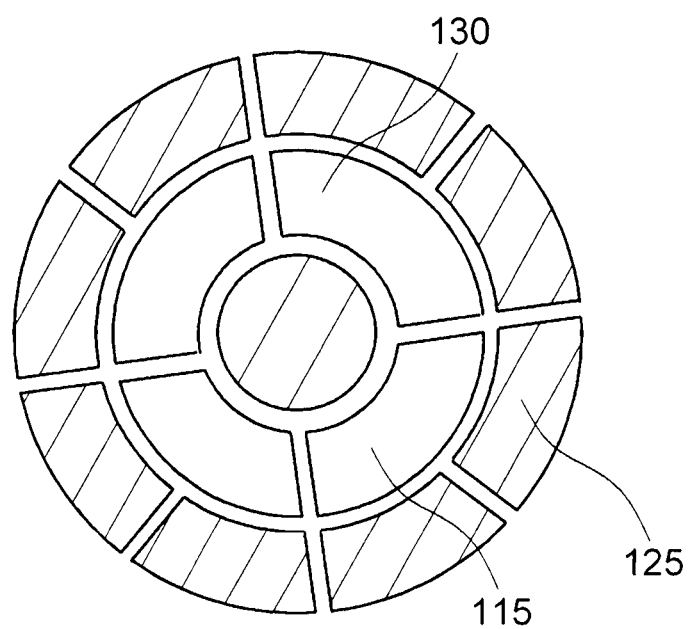
FIG. 14 is a sectional view of an assembly conductor after an alignment process according to a third modified example of the second example embodiment.

In a third modified example of the second example embodiment, the alignment process includes a process for arranging a plurality of inner peripheral side strands 115 around the center strand 130, as shown in FIG. 14. In this alignment process, a plurality of outer peripheral side strands 125 are additionally arranged around the inner peripheral side strands 115.

The inner peripheral side strands 115 have a lower hardness than the center strand 130. The outer peripheral side strands 125 have a higher hardness than the inner peripheral side strands 115. Therefore, a surface of the inner peripheral side strands 115 deforms in the plastic forming process to fill in the surrounding gaps.

Also, the inner peripheral side strands 115 may have a higher hardness than the center strand 130. An outside surface of the center strand 130 deforms in the plastic forming process to fill in the gaps between the inner peripheral side strands 115 and the center strand 130. An outer peripheral surface of the inner peripheral side strands 115 deforms in the plastic forming process to fill in the gaps between the inner peripheral side strands 115 and the outer peripheral side strands 125.

In this modified example of the example embodiment, the inner peripheral side strands 115 preferably has a lower hardness than the other strands. This modified example of the example embodiment makes it possible to improve the conductor space factor even when forming an assembly conductor having a large sectional area.

<Manufacturing Apparatus>

Figure 15:
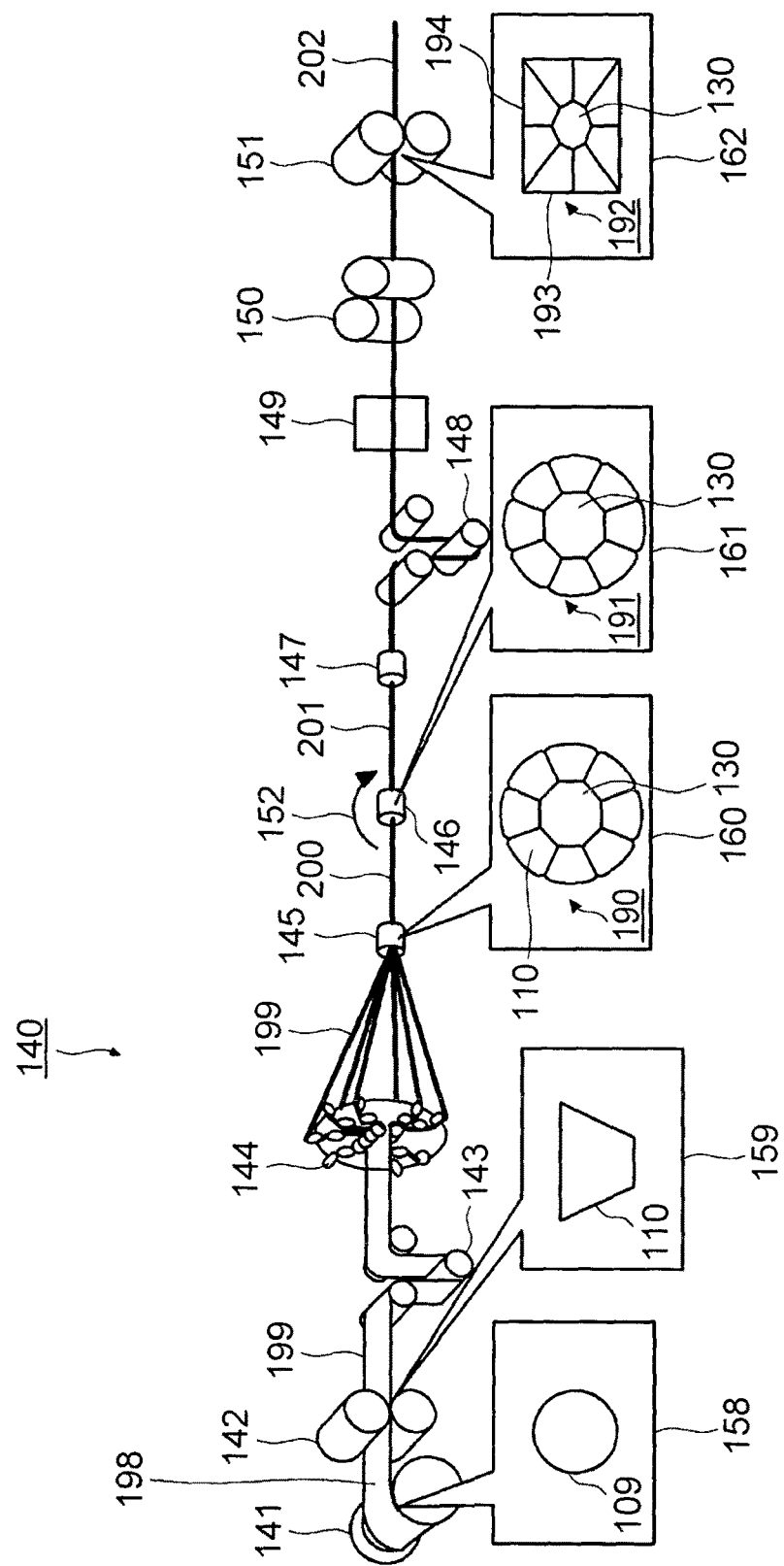
FIG. 15 is a schematic of a manufacturing apparatus according to the second example embodiment.

As shown in FIG. 15, a manufacturing apparatus 140 continuously manufactures an assembly conductor 202 from a conductor line group 198. FIG. 15 is a view showing a frame format of the conductor lines of the conductor line group 198 in a state lined up from the far side (in the depth direction) of the paper on which FIG. 15 is drawn toward the front (near) side.

A strand supplier 141 feeds the conductor line group 198 to a first pressure roller 142. As shown in the sectional view 158, a conductor line 109 has a circular cross-section. This conductor line 109 is part of the conductor line group 198 that will become the peripheral strands 110.

The first pressure roller 142 receives the conductor line group 198 from the strand supplier 141 and forms the peripheral strands 110 from a portion of the conductor line group 198 as shown in the sectional view 159. The first pressure roller 142 forms the side surface 11 and the side surface 12 by plastic deforming the outer peripheral portion of the conductor line 109 by rolling, for example, as the strand forming process before the alignment process. The shape of the cross-section of the peripheral strands 110 is just as shown in FIG. 12, for example.

The first pressure roller 142 gives the peripheral strands 110 a higher hardness than the center strand 130 by rolling. The first pressure roller 142 is able to adjust the hardness given to the peripheral strands 110, with a reduction in area of the peripheral strands 110 as a reference. The reduction in area is the difference in the ratio of the sectional area of the conductor lines 109 and peripheral strands 110. The material of the conductor line group 198 that make up the peripheral strands 110 is no different from that of the peripheral strands 10 described above.

In this example embodiment, the first pressure roller 142 selects the center strand 130 from a portion of the conductor line group 198. The first pressure roller 142 does not have to roll the center strand 130. Also, the first pressure roller 142 may plastic deform the outer peripheral portion of the portion of the conductor line group 198 by rolling, for example, and give the center strand 130 a lower hardness than the peripheral strands 110. Also, the first pressure roller 142 may give the center strand 130 a polygonal shape such as that shown in sectional view 160 and sectional view 161.

The first pressure roller 142 feeds a strand group 199 that includes the peripheral strands 110 and the center strand 130 to a speed adjusting guide roller 143. The strand group 199 illustrates a frame format of a state in which each strand is lined up from the far side (in the depth direction) of the paper on which the drawing is drawn toward the front (near) side.

The speed adjusting guide roller 143 receives the strand group 199 from the first pressure roller 142 and removes deformation from the peripheral strands 110 that occurred in the strand forming process. The speed adjusting guide roller 143 feeds the strand group 199 to an orientation adjusting roller 144.

The orientation adjusting roller 144 receives the strand group 199 from the speed adjusting guide roller 143. The orientation adjusting roller 144 spreads the strands of the strand group 199 out to create a positional relationship in which the peripheral strands 110 surround the center strand 130, as a first-half stage of the alignment process.

Also, the orientation adjusting roller 144 aligns the position and orientation of the peripheral strands 110 so that the inner peripheral surface 13 of the peripheral strands 110 faces the sides of the center strand 130. The orientation adjusting roller 144 then feeds the strand group 199 to a clamp 145.

The clamp 145 receives the strand group 199 from the orientation adjusting roller 144. The clamp 145 aligns the strand group 199 and arranges the peripheral strands 110 around the center strand 130 to form an aligned assembly conductor, i.e., an aligned assembly conductor 200, as the last-half stage of the alignment process. Also, the clamp 145 forms the aligned assembly conductor 200 such that the inner peripheral surface 13 of the peripheral strands 110 oppose the sides of the outside surface 131 of the center strand 130.

The clamp 145 applies a predetermined pressure to the aligned assembly conductor 200, in a direction toward the center of the aligned assembly conductor 200. Therefore, as shown in the sectional view 160, the peripheral strands 110 are close to the center strand 130 as well as to each other, in the cross-section 190 of the aligned assembly conductor 200. The clamp 145 feeds the aligned assembly conductor 200 to rotating machinery 146.

The rotating machinery 146 rotates in a predetermined rotational direction 152. In FIG. 15, the rotational direction 152 is oriented to give the twisted assembly conductor 201 a twist in a right-twist direction. The rotating machinery 146 twists the aligned assembly conductor 200 around the center strand 130 in the twisting process to form a twisted assembly conductor 201.

As shown in the sectional view 161, the aligned assembly conductor 200 is an assembly conductor in which the center strand 130 and the peripheral strands 110 having a predetermined shape are aligned. Therefore, the rotating machinery 146 is able to form a cross-section 191 in which the substantially circular shape of the cross-section 190 is maintained. The length of the outer periphery of the cross-section 191 changes due to the twisting process. This point will be described with reference to a third example embodiment of the invention. The rotating machinery 146 feeds the twisted assembly conductor 201 to a clamp 147.

The clamp 147 receives the twisted assembly conductor 201 from the rotating machinery 146. The clamp 147 applies a predetermined pressure to the twisted assembly conductor 201, in a direction toward the center of the twisted assembly conductor 201. Therefore, the peripheral strands 110, which are no longer in as close a contact with the center strand 130 as well as each other due to the twisting process, are again brought into close contact with the center strand 130 as well as with each other. The clamp 147 feeds the twisted assembly conductor 201 to a speed adjusting guide roller 148.

The speed adjusting guide roller 148 receives the twisted assembly conductor 201 from the clamp 147 and removes deformation from the twisted assembly conductor 201 that occurred in the twisting process. The speed adjusting guide roller 148 feeds the twisted assembly conductor 201 to a heater 149.

The heater 149 receives the twisted assembly conductor 201 from the speed adjusting guide roller 148 and heats the peripheral strands as a softening process. This softening process will be described with reference to first and second modified examples of the second example embodiment described above. If the manufacturing method does not include the softening process, the manufacturing apparatus 140 does not need to be provided with the heater 149. The heater 149 then feeds the twisted assembly conductor 201 to a second pressure roller 150.

The second pressure roller 150 receives the twisted assembly conductor 201 from the heater 149 or the speed adjusting guide roller 148. The second pressure roller 150 applies substantially planar pressure from a sideways direction in the drawing when the twisted assembly conductor 201 has a substantially flat shape, as a first-half stage of the plastic forming process.

The second pressure roller 150 gives a vertical wall surface 193 to right and left ends of a cross-section 192 of the assembly conductor 202 in the drawing, as shown in sectional view 162. The second pressure roller 150 then feeds the twisted assembly conductor 201 to a third pressure roller 151.

The third pressure roller 151 receives the twisted assembly conductor 201 from the second pressure roller 150. The third pressure roller 151 applies substantially planar pressure from a vertical direction in the drawing when the twisted assembly conductor 201 has a substantially flat shape, as the first-half stage of the plastic forming process.

The third pressure roller 151 give a lateral wall surface 194 to upper and lower ends of cross-section 192 of the assembly conductor 202 in the drawing, as shown in sectional view 162. The third pressure roller 151 then feeds the assembly conductor 202 to a coil manufacturing process, for example.

Third Example Embodiment

A manufacturing method of an assembly conductor according to a third example embodiment of the invention is a manufacturing method of an assembly conductor in which conductor lines are assembled. In this example embodiment, an assembly conductor is formed similar to the first example embodiment, except for the following. Hereinafter, equivalent members and the like will be denoted by like reference characters, and redundant descriptions will be omitted.

<Intentionally Provided Gap>

Figure 16:
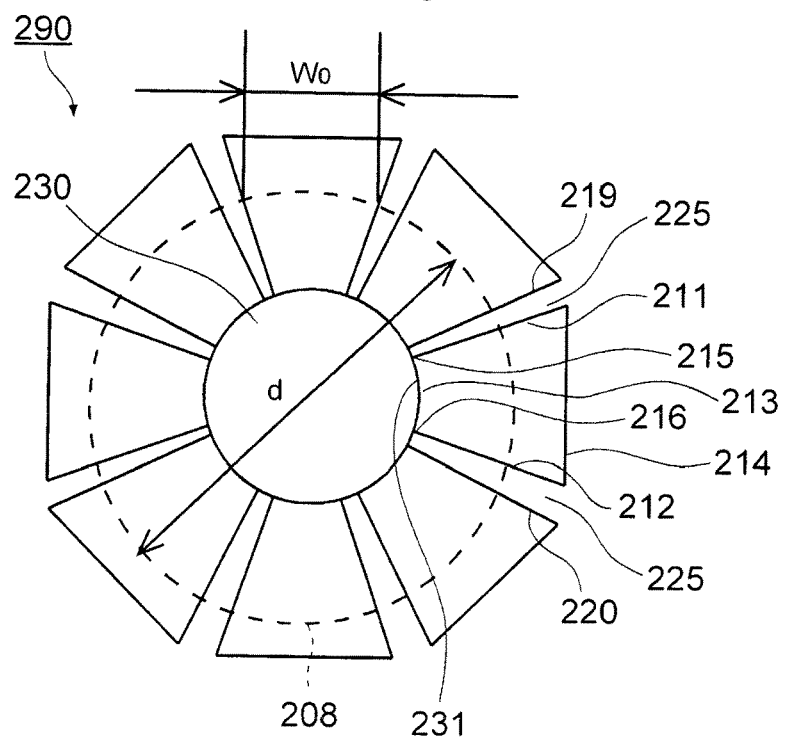
FIG. 16 is a sectional view of an assembly conductor after an alignment process according to a third example embodiment of the invention.

As shown in FIG. 16, a plurality of peripheral strands formed by conductors are aligned around a center strand 230 that is formed by a conductor. At least some of the plurality of peripheral strands, or all of the peripheral strands, are peripheral strands 210 that two side surfaces. Making all of the peripheral strands have two side surfaces enables a gap in the assembly conductor to be made smaller in a twisting process that will be described later.

Each peripheral strand 210 has a side surface 211 and a side surface 212. An inner peripheral surface 213 of the peripheral strand 210 may be contacting an outside surface 231 of the center strand 230. In this example embodiment, in this state, a clearance 225 positioned between opposing side surfaces of adjacent peripheral strands 210 is provided in a cross-section 290. The side surface 211 opposes a side surface 219 of one adjacent peripheral strand 210. Also, the side surface 212 opposes a side surface 220 of another adjacent peripheral strand 210.

The clearance 225 is positioned between the side surface 211 and the side surface 219, as well as between the side surface 212 and the side surface 220. The clearance 225 may also be positioned between at least some of the side surfaces. The clearance 225 may also be positioned between one of the two side surfaces, and a side surface of at least one of the adjacent peripheral strands on both sides, which opposes the two side surfaces. The clearance 225 may also be positioned between the all of the side surfaces. In this case, the clearance 225 between the peripheral strands is reduced substantially equally, with the inner peripheral surface 213 contacting the outside surface 231, when the twisting process is performed.

Figure 17:
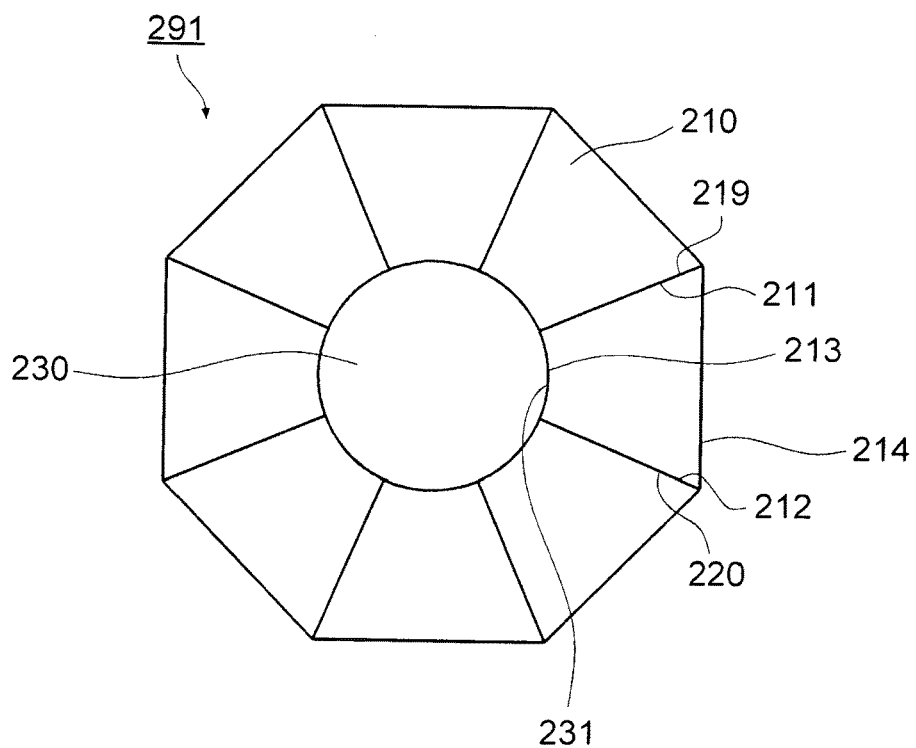
FIG. 17 is a sectional view of the assembly conductor after a twisting process according to the third example embodiment.

As shown in FIG. 17, in the twisting process, the peripheral strands 210 are twisted just like the peripheral strands 10 described above. This twisting increases the width of an outer peripheral surface 214 of the peripheral strands 210 in the circumferential direction. This twisting increases not only the width of the outer peripheral surface 214, but also the width of the inner peripheral surface 213 in the circumferential direction.

This twisting increases the width between the side surface 211 and the side surface 212 in the circumferential direction. Therefore, in the twisting process, the clearance 225 is reduced. As shown in FIG. 17, with the peripheral strand 210 having an ideal design value, the clearance 225 is eliminated all together.

The clearance 225 having an appropriate design value is desirable clearance that improves the conductor space factor of the assembly conductor. In designing the peripheral strands 210, attention must be paid to the differences between this and the gap 29 described above as well as other gaps.

In the alignment process, the peripheral strands may be arranged such that the clearance between opposing side surfaces becomes narrower toward the center strand. As shown in FIG. 16, the width of the clearance 225, which appears in cross-section 290, becomes narrower toward the center strand 230. With this mode, the conductor space factor of the assembly conductor after the plastic forming process becomes even higher.

If the side surface 211 and the side surface 212 are substantially flat, for example, the clearance 225 will not occur if the angle formed by these is 45 degrees. However, if this angle is 43 degrees, the clearance 225 will occur.

<Shape of the Peripheral Strands>

In the alignment process, the plurality of peripheral strands 210 are aligned to form a single layer in which they are lined up in the circumferential direction. Every one of the plurality of peripheral strands 210 has two side surfaces that opposes another peripheral strand 210 that is adjacent in the circumferential direction. These two side surfaces, are the side surface 211 and the side surface 212, for example.

The size of the clearance 225 in the alignment process depends on the length in the circumferential direction between two side surfaces within the peripheral strand 210. The length in the circumferential direction between two side surfaces is not the clearance between opposing side surfaces described above. The length in the circumferential direction between two side surfaces is the length in the circumferential direction between the side surface 211 and the side surface 212, within one peripheral strand 210, for example.

A length $W_0$ in the circumferential direction between two side surfaces satisfies expression (1) below at a distance d/2 from the center of the assembly conductor after the alignment process. A peripheral line 208 indicates an outer peripheral line at distance d/2. The circumferential direction described above is a direction along the peripheral line 208. Hereinafter, d may be referred to as a "radial position". The term "P" indicates a length (twist pitch) that corresponds to one twist of the assembly conductor after the twisting process. The term "n" indicates the number of peripheral strands. In this example embodiment, n=8.

$$W_0 \leq \pi \cdot d/n \cdot P/\sqrt{(\pi^2 \cdot d^2 + P^2)} \tag{1}$$

In this example embodiment, the length $W_0$ of the peripheral line at a given radial position d is set in advance as described above. Therefore, the peripheral strands 210 after the twisting process are placed in a state in which there are almost no gaps in between, i.e., the peripheral strands 210 are closely contacting one another. The appropriately designed length $W_0$ improves the conductor space factor of the assembly conductor after the plastic forming process, even with the gaps provided in the alignment process.

In the alignment process, the inner peripheral surface 213 contacts the outside surface 231 of the center strand 230. The length $W_0$ in the circumferential direction between two side surfaces also essentially satisfies expression (2) below at a distance $d/2=d_0/2$ from the center of the assembly conductor.

$$W_0 = \pi \cdot d_0/n \cdot P/\sqrt{(\pi^2 \cdot d_0^2 + P^2)} \qquad (2)$$

$d_0/2$ indicates the distance from the center of the assembly conductor after the alignment process to an end portion on the side near the center strand of the two side surfaces. This end portion is an end portion 215 of the side surface 211 or an end portion 216 of the side surface 212 in FIG. 16, for example.

Giving the peripheral strands 210 the shape expressed by expression (2) above is advantageous when peripheral strands having a higher hardness than the center strand are aligned as in the second example embodiment described above. In the second example embodiment, the conductor flows in from the center strand and fills in the gap between the peripheral strands and the center strand in the plastic forming process.

Meanwhile, giving the peripheral strand 210 the shape described above makes the gap between adjacent peripheral strands smaller on the center strand side. Therefore, it is possible to prevent the conductor that flows in from the center strand to also flow into the gaps between the peripheral strands. Thus, the conductor that flows in from the center strand is able to efficiently fill in the gap between the peripheral strands and the center strand in the plastic forming process.

<Technical Mode 4>

Figure 18:
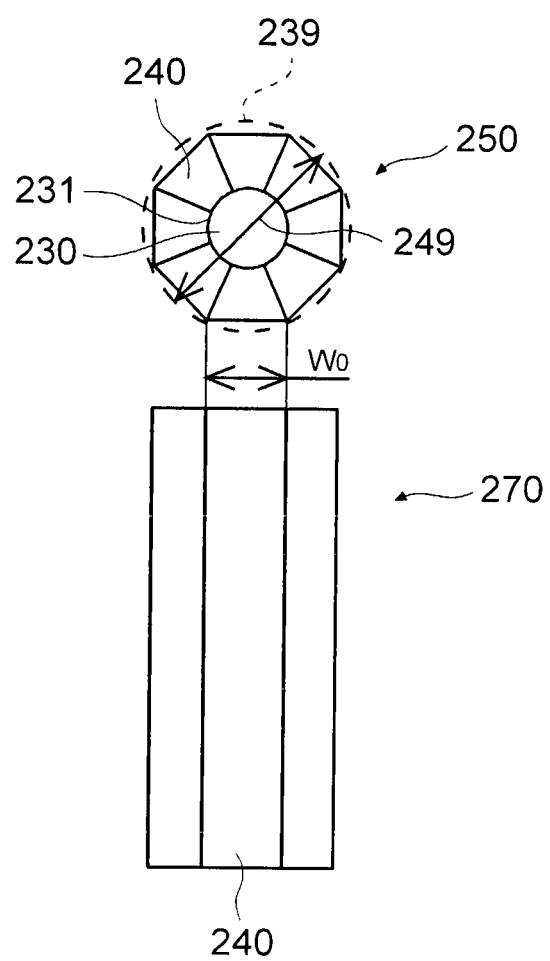
FIG. 18 is a first explanatory view of a technical issue according to the third example embodiment.

Further issues and effects relating to this example embodiment will be described with reference to technical mode 4 using FIGS. 18 to 20. Technical mode 4 is the same as the first example embodiment described above. In technical mode 4, the shapes of peripheral strands 240 and the center strand 230 are able to be set such that an assembly conductor 270 is dense in an aligned state, as shown in FIG. 18. Dense in this case refers to gaps between the peripheral strands 240 and the center strand 230, as well as between adjacent peripheral strands 240 being small in a cross-section 250 of the assembly conductor 270.

A width in the circumferential direction of an outer peripheral surface 244 in the cross-section 250 of the assembly conductor 270 is equal to the length $W_0$ between two side surfaces, at a radial position of a circumscribed circle diameter 249. The length $W_0$ is 1/n times the length of a circumscribed circle 239 of the assembly conductor 270, in the cross-section 250. Here, n represents the number of peripheral strands. In FIGS. 18 and 19, with regard to the width in the circumferential direction, the curvature in the circumferential direction is shown simplified.

Figure 19:
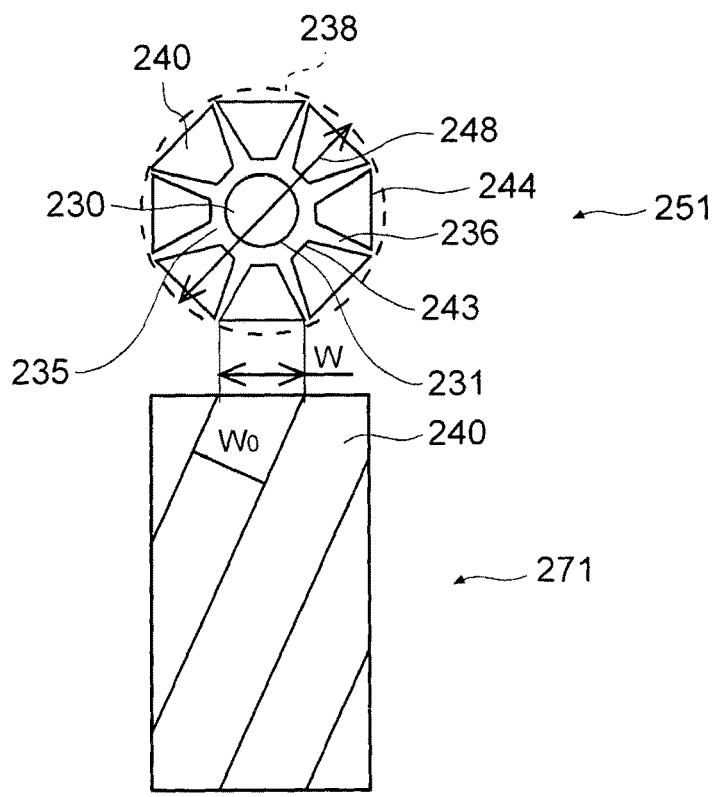
FIG. 19 is a second explanatory view of the technical issue according to the third example embodiment.
Figure 20:
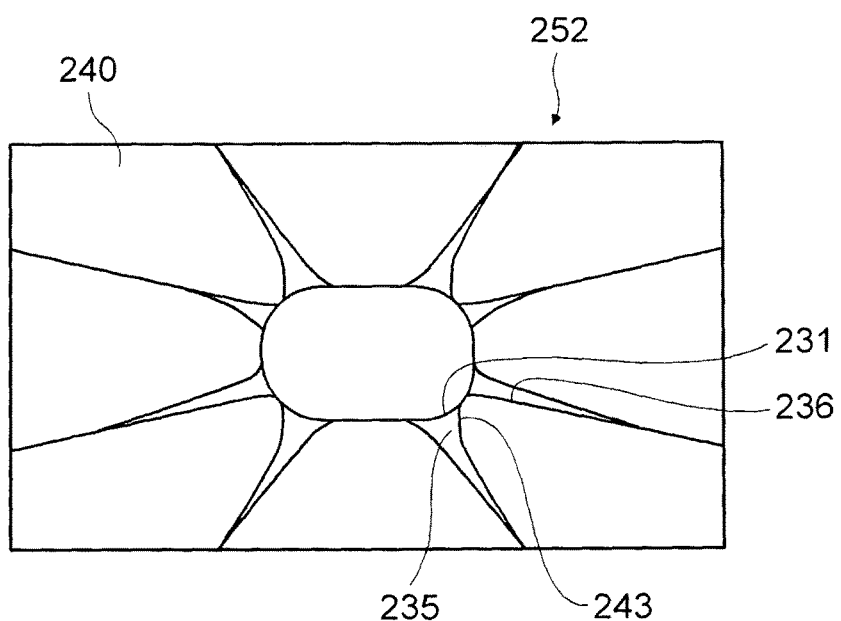
FIG. 20 is a third explanatory view of the technical issue according to the third example embodiment.

In the twisting process, a gap 235 and a gap 236 are created and expanded between the peripheral strands 240 and the center strand 230 as shown in FIG. 19. The gap 235 is positioned between an outside surface 231 of the center strand 230, and an inner peripheral surface 243 of the peripheral strands 240. The gap 236 is positioned between adjacent peripheral strands 240.

When the peripheral strands 240 are twisted by the twisting process, the width of the outer peripheral surface 244 in a cross-section 251 of an assembly conductor 271 expands to a length W. The length W is larger than the length $W_0$ due to a slope of the peripheral strands 240 with respect to the direction in which the assembly conductor 271 extends, and has a value expressed in Expression (3).

$$W = W_0 \times \sqrt{(\pi^2 \cdot d_0^2 + P^2)}/P \qquad (3)$$

Therefore, when the peripheral strands 240 are closely aligned in the circumferential direction before the twisting process, adjacent peripheral strands 240 will interfere with each other at end portions of the outer peripheral surface 244 of the peripheral strands 240. As a result, the gap 236 occurs.

Also, a circumscribed circle 238 is $\sqrt{(\pi^2 \cdot d_0^2 + P^2)}/P$ times its value so as to eliminate the interference at the outer peripheral surface 244. At the same time, a circumscribed circle diameter 248 of the outer peripheral surface 244 becomes larger than the circumscribed circle diameter 249. Therefore, the peripheral strands 240 will float (i.e., move) toward the outside of the assembly conductor. The gap 235 and the gap 236 are often large, so gaps tend to remain after the plastic forming process, as shown in FIG. 20.

In contrast to this, in this example embodiment, gaps are provided between the peripheral strands 210 beforehand, as shown in FIG. 16. Therefore, the peripheral strands 210 are inhibited from floating toward the outside of the assembly conductor in the twisting process. Hence, the conductor space factor of the assembly conductor after the plastic forming process increases.

Hereinafter, members equivalent to those in the first example embodiment described above will be denoted by like reference characters, and redundant descriptions of those members will be omitted.

Example 1

Peripheral strands are able to be designed and an assembly conductor is able to be manufactured just as described below, based on the third example embodiment. In Expression (1) above, $d=d_0=1.1$ mm at an end portion of the two side surfaces on the side near the center strand. Here, d is equal to an inner peripheral wire diameter of the peripheral strands, and the twist pitch P is 15 mm.

Figure 21:
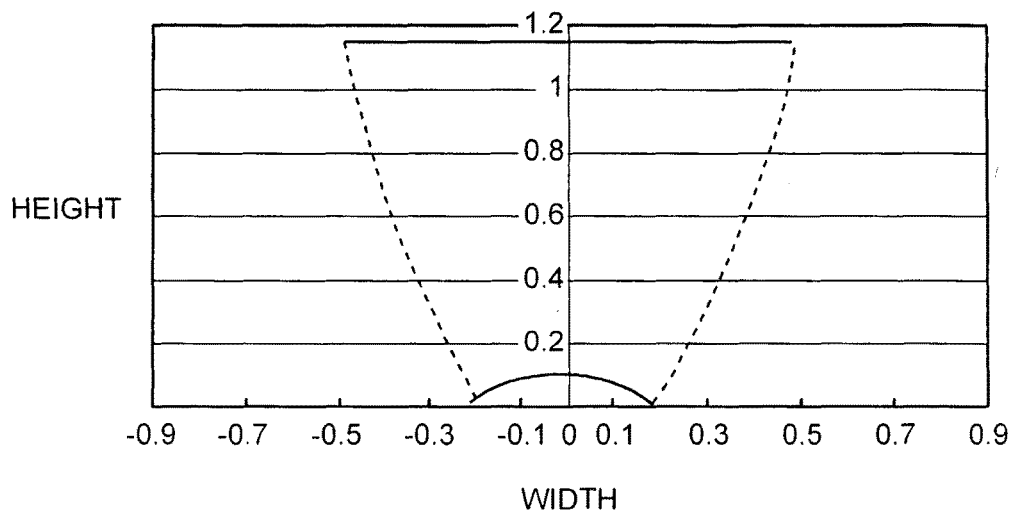
FIG. 21 is a first graph illustrating the shape of peripheral strands according to an example.

As a result of this design, the design shape of the peripheral strands and the length $W_0$ such as those shown in FIG. 21 were obtained. The vertical axis of the graph represents the height in a direction from the inner peripheral surface side of the peripheral strands toward the outer peripheral surface side of the peripheral strands. The horizontal axis of the graph represents the width in a direction orthogonal to the height. The width corresponding to the length of an arc over the distance d/2 that corresponds to the height increases as the length $W_0$ corresponding to the length of the arc increases.

Example 2

Figure 22:
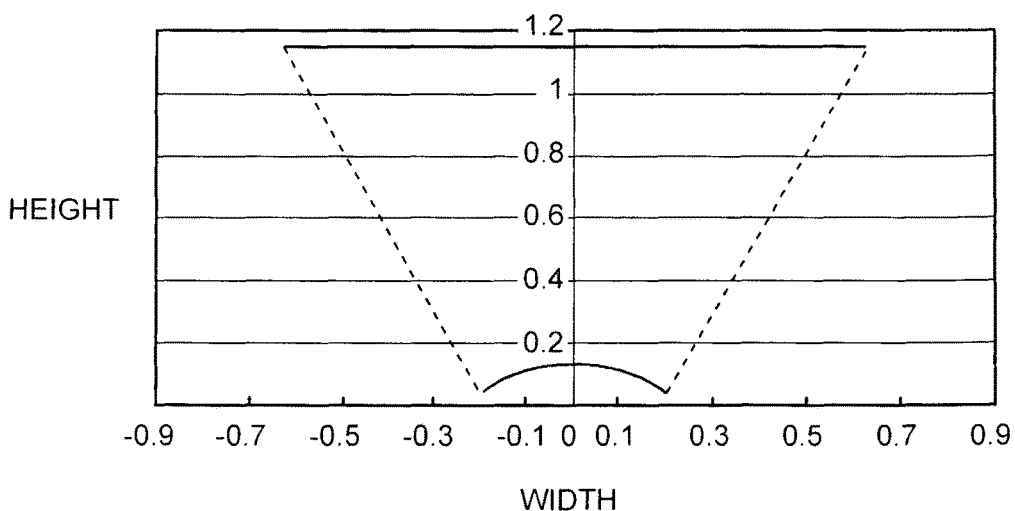
FIG. 22 is a second graph illustrating the shape of peripheral strands according to an example.

An assembly conductor similar to that of Example 1 may be manufactured. When designing the peripheral strands, the twist pitch P is made 100 mm. Everything else is the same as it is in Example 1. The design shape of the peripheral strands and the length $W_0$ such as those shown in FIG. 22 were obtained.

When comparing Example 1 to Example 2, it is evident that with the design shape, deviation from the shape of the peripheral strands that enables the dense state to be created in the alignment process increases as the twist pitch becomes smaller.

Therefore, when (inner peripheral wire diameter)/(twist pitch)<0.011, it is evident that the shape of the peripheral strands in the third example embodiment is particularly effective for improving the conductor space factor of the assembly conductor.

Example 3

Figure 23:
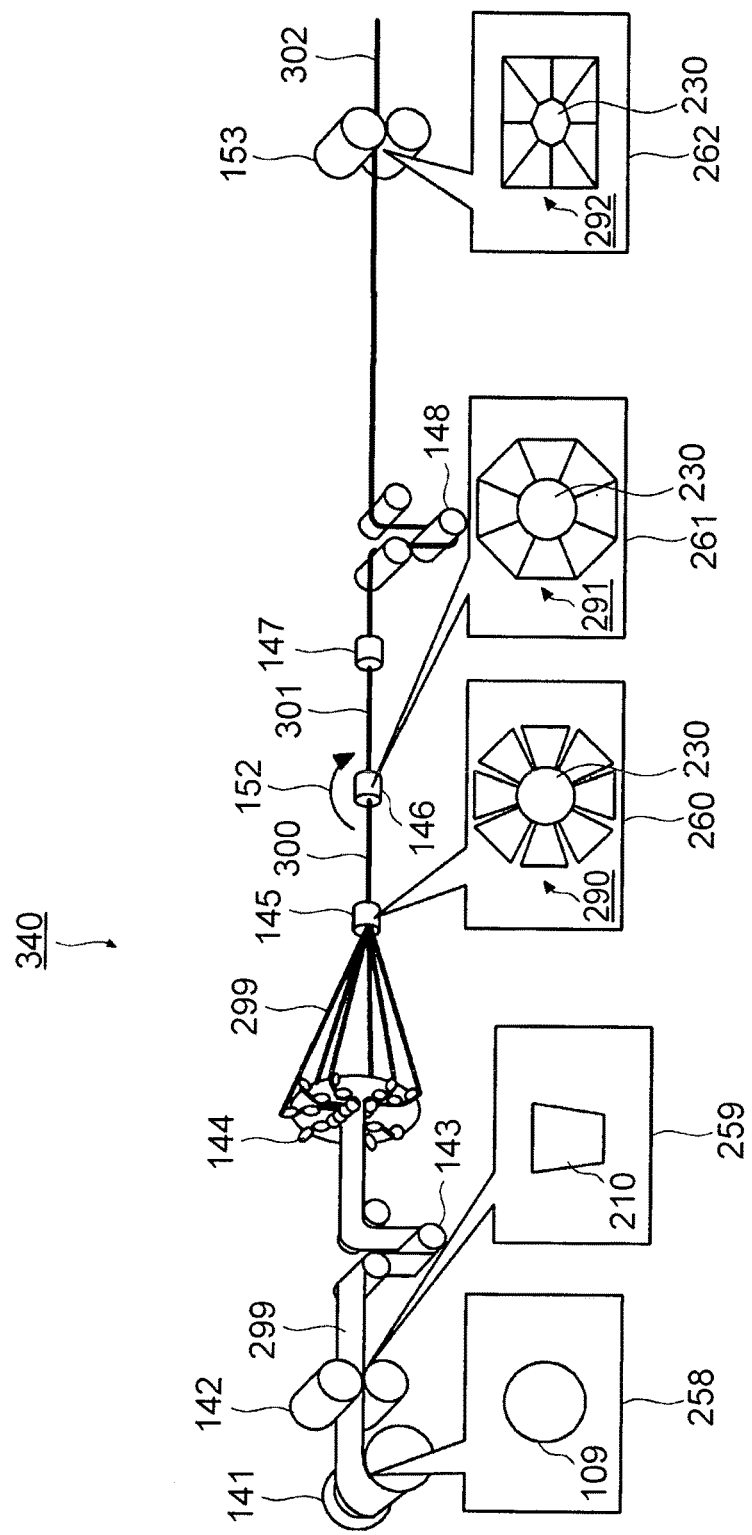
FIG. 23 is a schematic of the manufacturing apparatus according to the an example.

A manufacturing method of an assembly conductor 302, which has characteristics of the second example embodiment and the third example embodiment may be implemented in a manufacturing line 340 shown in FIG. 23. The manufacturing line 340 has similar constituent elements as the manufacturing apparatus 140. Therefore, the description will focus on the differences from the manufacturing apparatus 140, and redundant descriptions will be omitted just as described above.

As shown in FIG. 23, the manufacturing line 340 manufactures the assembly conductor 302 in a continuous manner from the conductor line group 198. In a sectional view 258, the conductor line 109 is part of the conductor line group 198 that will become the peripheral strands 210.

The first pressure roller 142 forms the peripheral strands 210 as shown in sectional view 259. The peripheral strands 210 have a shape in which the gaps between the peripheral strands 210 become larger farther toward the outer peripheral side, just as described in the third example embodiment.

Figure 24:
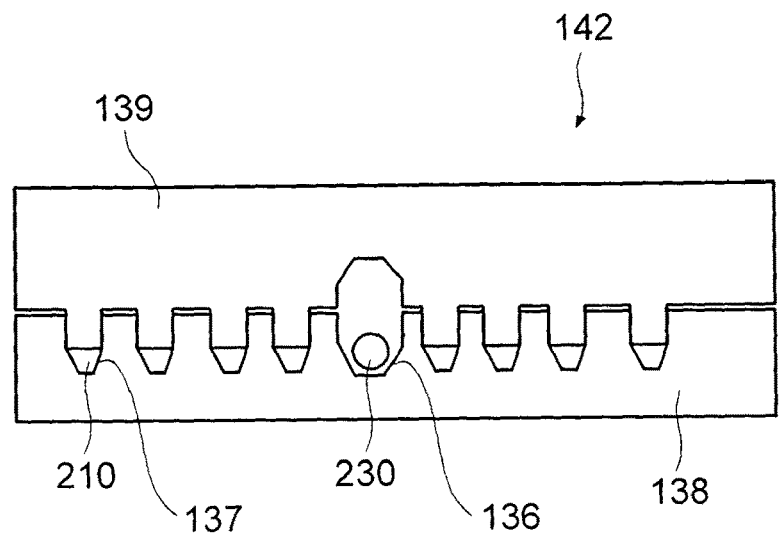
FIG. 24 is a sectional view of a first pressure roller of the manufacturing apparatus according to an example.

As shown in FIG. 24, the first pressure roller 142 has a roller 139 and the roller 138. The roller 138 has grooves 137 lined up in the surface, and a groove 136 is positioned within this row of grooves 137. Therefore, the first pressure roller 142 is able to select the center strand 230 from a portion of the conductor line group 198.

The first pressure roller 142 feeds out a strand group 299 in which the center strand 230 is lined up in the row of the peripheral strands 210. Therefore, the orientation adjusting roller 144 spreads out the strands of the strand group 299 so as to be able to efficiently create a positional relationship in which the peripheral strands 210 surround the center strand 230. The orientation adjusting roller 144 also prevents the center strand 230 and the peripheral strands 210 from becoming tangled in the alignment process.

The roller 139 applies pressure to the conductor lines 109 that pass through the grooves 137. The roller 139 and the roller 138 work in cooperation to roll the conductor lines 109 in a single line, and form the peripheral strands 210. The conductor line 109 that is to become the center strand 230 passes through the groove 136 without receiving any pressure.

As shown in sectional view 260, an assembly conductor that has been aligned, i.e., an aligned assembly conductor 300, that has been fed from the clamp 145 has the cross-section 290 described above. As shown in sectional view 261, a twisted assembly conductor 301 fed from the rotating machinery 146 has a sectional shape of a cross-section 291 with little gaps.

In the manufacturing line 340, the heater 149 and the third pressure roller are omitted. The second pressure roller 153 combines the functions of the second pressure roller 150 and the third pressure roller 151 described with reference to FIG. 15.

Figure 25:
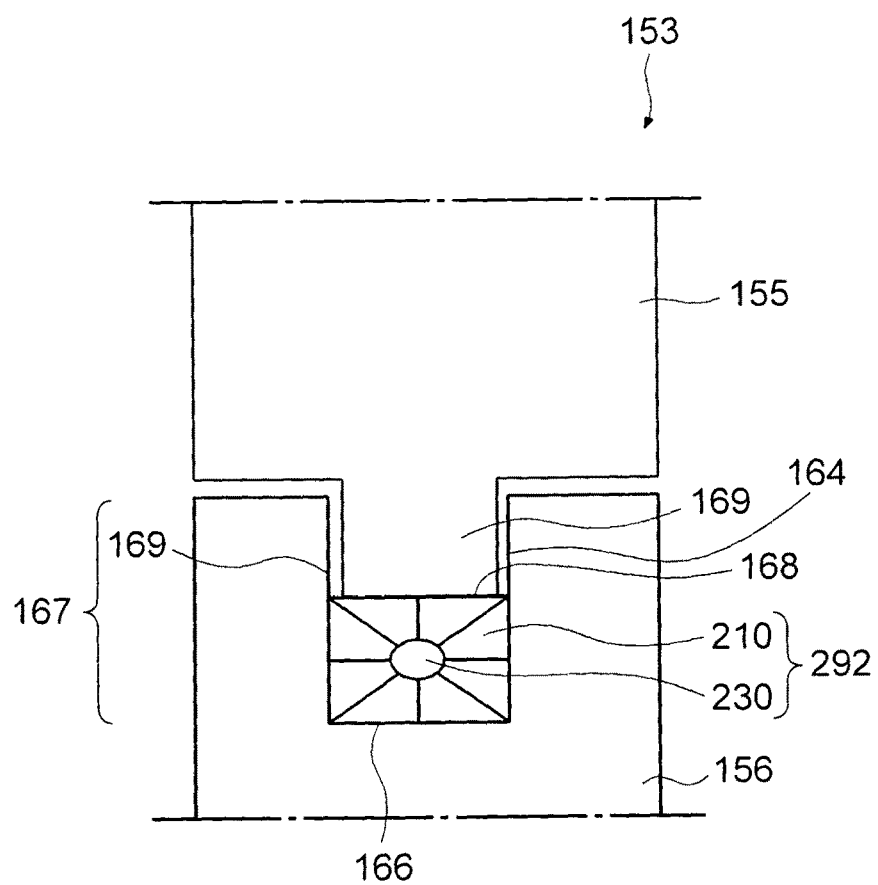
FIG. 25 is a sectional view of a second pressure roller according to the manufacturing apparatus according to an example.

As shown in FIG. 25, the second pressure roller 153 simultaneously applies pressure from two directions, i.e., a vertical direction and a lateral direction of a substantially rectangular (flat) shape required of the assembly conductor 302, in the plastic forming process. Therefore, the second pressure roller 153 compresses and forms the twisted assembly conductor 301 that is twisted, thus forming the assembly conductor 302 having the shape of cross-section 292, as shown in sectional view 262.

The second pressure roller 153 includes a roller 155 and a roller 156. The roller 155 has a pressure apply portion 169. This pressure apply portion 169 has a pressure apply surface 168. The roller 156 has a groove 167. This groove 167 has a bottom surface 166. The pressure apply surface 168 and the bottom surface 166 apply pressure in the vertical direction in the drawing to the twisted assembly conductor 301.

A wall surface 165 and a wall surface 164 of the groove 167 apply pressure in the lateral direction in the drawing to the twisted assembly conductor 301.

With the manufacturing method according to the third example embodiment, the gaps in the twisted assembly conductor 301 are made smaller in the twisting process. Therefore, compression in the vertical and lateral directions may be performed together in the plastic forming process, just as described above. In this example, the plastic forming process is finished in one stage, so overall production efficiency improves.

Example 4

Figure 26:
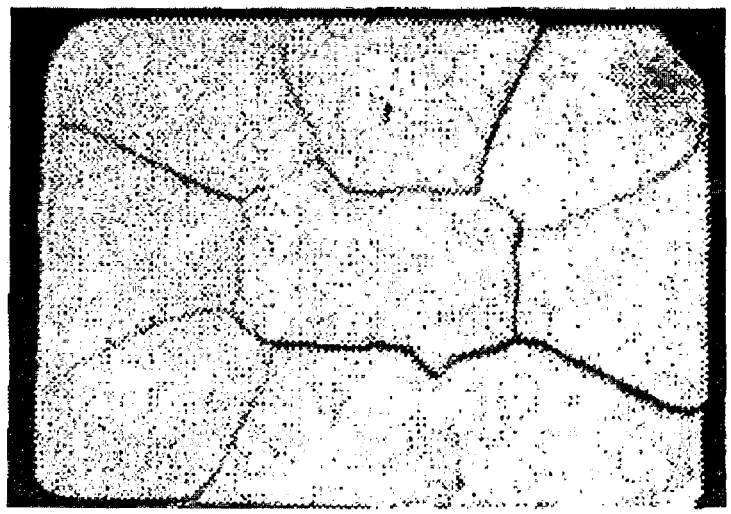
FIG. 26 is a sectional view of the assembly conductor according to an example.

A center strand and eight peripheral strands having a higher hardness than and the center strand were aligned, twisted, and formed based on the second example embodiment, to obtain an assembly conductor. The peripheral strands had a shape that satisfies Expression (1) described above, based on the third example embodiment. The conductor lines were made of tough pitch copper. FIG. 26 is a view of a cross-section of the assembly conductor of Example 4.

Comparative Example 1

Figure 27:
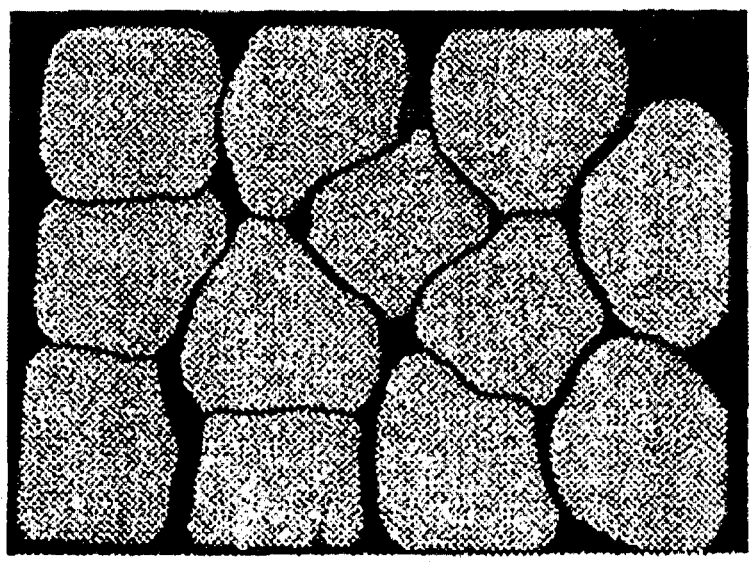
FIG. 27 is a sectional view of an assembly conductor according to a comparative example.

An assembly conductor similar to that of Example 4, except for that three conductor lines having circular cross-sections were aligned surrounded by nine conductor lines having circular cross-sections, was formed. FIG. 27 is a view of a cross-section of the assembly conductor of Comparative example 1. When Example 4 is compared to Comparative example 1, the conductor space factor was improved from 80% to 99%.

Comparative Example 2

Figure 28:
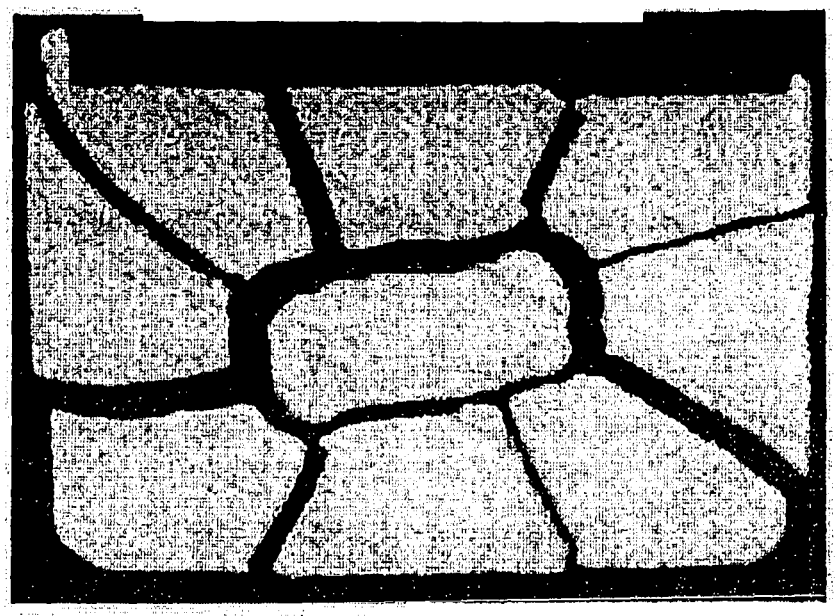
FIG. 28 is a sectional view of the assembly conductor according to another comparative example.

An assembly conductor similar to that of Example 4, except for that the assembly conductor was formed such that the peripheral strands are closely lined up in the alignment process, was formed. FIG. 28 is a view of a cross-section of the assembly conductor of Comparative example 2. When Example 4 is compared to Comparative example 2, the conductor space factor was improved from 83% to 99%.

OBSERVATIONS

If an attempt is made to obtain an assembly conductor having a high conductor space factor by only the manufacturing method of the second example embodiment, it may place a high load on the manufacturing apparatus. Therefore it is evident that the load on the apparatus is able to be reduced, and high production efficiency is able to be obtained, by combining it (i.e., the manufacturing method of the second example embodiment) with the manufacturing method of the third example embodiment.

In particular, obtaining a dense assembly conductor before the plastic forming process contributes to increased production efficiency in the manufacturing method of this example embodiment. Also, because the method in this example enables a high conductor space factor to be obtained, it is also possible to form an assembly conductor using material that does not deform as easily as tough pitch copper.

The invention is not limited to the foregoing example embodiments and examples, but may be carried out with appropriate modifications without departing from the scope thereof.

The invention claimed is:

1. An assembly conductor manufacturing method comprising:

aligning, around a center strand, a plurality of peripheral strands, each having at least two side surfaces, one of which opposes an adjacent peripheral strand on one side in a circumferential direction and the other of which opposes an adjacent peripheral strand on the other side in the circumferential direction, so as to form an assembly conductor in which the center strand and the peripheral strands are aligned;

twisting the plurality of peripheral strands around the center strand to form a twisted assembly conductor; and deforming the twisted assembly conductor into a substantially rectangular sectional shape, wherein the peripheral strands provided with the two side surfaces each have a sectional shape in which a width between the side surfaces becomes narrower toward the center strand, an inner peripheral surface that contacts an end portion of each of the two side surfaces on the side near the center strand, and that opposes the center strand, is formed on each peripheral strand, a clearance is provided between the side surfaces of peripheral strands that are positioned adjacent to each other while the inner peripheral surface of each peripheral strand is contacting the center strand, when the peripheral strands are aligned around the center strand, the clearance is reduced while the inner peripheral surface of each peripheral strand is contacting the center strand when the plurality of peripheral strands are twisted, when aligning the peripheral strands, a length $W_0$ in the circumferential direction between the two side surfaces of the peripheral strands satisfies Expression (1) below at a distance $d/2$ from the center of the assembly conductor, $$W_0 \leq \pi \cdot d/n \cdot P/\sqrt{(\pi^2 \cdot d^2 + P^2)} \quad (1)$$

where $d/2$ is a distance from the center of the assembly conductor after alignment, n is the number of peripheral strands, and P is a twist pitch corresponding to one twist of the assembly conductor after twisting.

2. The assembly conductor manufacturing method according to claim 1, wherein an outside surface of the center strand has a sectional shape that protrudes outward and is continuous in a direction in which the center strand extends.

3. The assembly conductor manufacturing method according to claim 1, wherein the inner peripheral surface has a sectional shape that curves inward, and is continuous in a direction in which the peripheral strands extend.

4. The assembly conductor manufacturing method according to claim 1, further comprising:

forming strands by plastically deforming an outer peripheral portion of a conductor line that is to become at least a portion of the peripheral strands, and forming the two side surfaces, before aligning the peripheral strands.

5. The assembly conductor manufacturing method according to claim 4, wherein the peripheral strands are given a higher hardness than the center strand when forming the strands.

6. The assembly conductor manufacturing method according to claim 1, wherein the peripheral strands each have a sectional shape in which a width between the side surfaces becomes narrower toward the center strand, such that the clearance becomes narrower toward the center strand, when aligning the peripheral strands around the center strand.

7. The assembly conductor manufacturing method according to claim 1, wherein the hardness of one or more peripheral strands is different from the hardness of the center strand.

* * * * *